(12) United States Patent
Kuromizu

(10) Patent No.: US 9,476,577 B2
(45) Date of Patent: Oct. 25, 2016

(54) LIGHTING DEVICE, DISPLAY DEVICE, AND TELEVISION RECEPTION DEVICE

(75) Inventor: Yasumori Kuromizu, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 424 days.

(21) Appl. No.: 14/005,750

(22) PCT Filed: Apr. 2, 2012

(86) PCT No.: PCT/JP2012/058901
§ 371 (c)(1),
(2), (4) Date: Sep. 17, 2013

(87) PCT Pub. No.: WO2012/133889
PCT Pub. Date: Oct. 4, 2012

(65) Prior Publication Data
US 2014/0009696 A1    Jan. 9, 2014

(30) Foreign Application Priority Data
Mar. 31, 2011    (JP) .................. 2011-079984

(51) Int. Cl.
*F21V 23/00*    (2015.01)
*G02F 1/1335*    (2006.01)
*F21V 5/04*    (2006.01)
(Continued)

(52) U.S. Cl.
CPC .............. *F21V 23/002* (2013.01); *F21K 9/60* (2016.08); *F21V 5/04* (2013.01); *F21V 13/04* (2013.01); *G02F 1/133603* (2013.01);
(Continued)

(58) Field of Classification Search
CPC ................................... F21V 23/002
See application file for complete search history.

(56) References Cited

U.S. PATENT DOCUMENTS 7,094,091 B2   8/2006 Grzegorzewska et al.
7,431,475 B2   10/2008 Hafuka et al.
(Continued)

FOREIGN PATENT DOCUMENTS

| JP | 2005-535498 A | 12/2005 |
|----|---------------|---------|
| JP | 2010-230951 A | 10/2010 |
| JP | 2011-29188 A  | 2/2011  |
| WO | 2010/146894 A1 | 12/2010 |

OTHER PUBLICATIONS

U.S. Appl. No. 14/005,117, filed Sep. 13, 2013.

*Primary Examiner* — Anh Mai
*Assistant Examiner* — Zachary J Snyder
(74) *Attorney, Agent, or Firm* — Chen Yoshimura LLP

(57) ABSTRACT

A backlight device according to the present invention is provided with: a chassis having a bottom plate 22a and a side plate; LED substrates 25 disposed on the bottom plate 22a of the chassis in a manner so that one end surface of the LED substrates and the side plate face each other; LEDs disposed on the LED substrates 25 with the obverse side as the light exit side; a wiring pattern 35 disposed on the LED substrates 25; a first connector 31 connected to the wiring pattern 35 and disposed on the end on the side provided with the one end surface among the ends of the LED substrates 25; a second connecting member that is electrically connected to the first connector 31 with the direction of connection being a direction that is along the plate surface of the bottom plate 22a, forming in a plan view an angle with the first side edge 22a1 that faces the one end surface, and facing the first side edge 22a1 from the reverse side from the first side edge 22a1 sandwiching the first connector 31; and a power supply wiring line 38 that is electrically connected to the second connector 32.

20 Claims, 29 Drawing Sheets

(51) Int. Cl.
*F21V 13/04* (2006.01)
*H04N 5/64* (2006.01)
*G02F 1/1362* (2006.01)

(52) U.S. Cl.
CPC .......... *H04N 5/64* (2013.01); *G02F 1/13624* (2013.01); *G02F 1/133608* (2013.01); *G02F 2001/133607* (2013.01); *G02F 2001/133612* (2013.01); *G02F 2001/133614* (2013.01); *G02F 2201/465* (2013.01); *G02F 2201/52* (2013.01)

(56) References Cited

U.S. PATENT DOCUMENTS

| | | |
|---|---|---|
| 7,894,014 B2 | 2/2011 | Kawase et al. |
| 8,009,247 B2 | 8/2011 | Oku et al. |
| 8,043,109 B2 | 10/2011 | Bishop et al. |
| 2008/0198597 A1 | 8/2008 | Blumel |
| 2009/0302780 A1 | 12/2009 | Kim et al. |
| 2010/0245708 A1 | 9/2010 | Baba et al. |
| 2011/0021061 A1 | 1/2011 | Bishop et al. |
| 2012/0086871 A1 | 4/2012 | Yokota |

LIGHTING DEVICE, DISPLAY DEVICE, AND TELEVISION RECEPTION DEVICE

TECHNICAL FIELD

The present invention relates to an illumination device, a display device, and a television receiver.

BACKGROUND ART

In recent years, flat panel display devices that use flat panel display elements such as liquid crystal panels and plasma display panels are increasingly used as display elements for image display devices, such as television receivers, instead of conventional cathode-ray tube displays, allowing image display devices to be made thinner. Liquid crystal panels used in liquid crystal display devices do not emit light on their own, and therefore, it is necessary to provide a separate backlight device as an illumination device.

One of the known backlight devices is a direct illumination type backlight device in which light is directly supplied to the liquid crystal panel from the rear surface thereof. In such a direct illumination type backlight device, a light source substrate having light sources such as LEDs disposed thereon is provided along a bottom plate of a chassis that is used as a case. On the light source substrate, a wiring pattern for electrically connecting the respective light sources to each other is formed, and terminals provided at both ends of the wiring pattern are electrically connected to a connector that is provided at one end of a power supply wiring line extending from a power supply substrate. In this way, power is supplied to the respective light sources from the power supply substrate through the connector. Patent Document 1, for example, discloses a conventional example of such a direct illumination type backlight device.

RELATED ART DOCUMENT

Patent Document

Patent Document 1: Japanese Patent Application Laid-Open Publication No. 2010-230951

PROBLEMS TO BE SOLVED BY THE INVENTION

When a large image display device is realized by arranging a plurality of display devices adjacent to each other, and the like, it is preferable that outer edges of each display device be made less noticeable. In order to make the outer edges of the display device less noticeable in the direct illumination type backlight device in which a display region corresponds in position to a region where the light sources are disposed, it is necessary to reduce the width of a non-display region that surrounds the display region, or in other words, it is necessary to make a frame region narrower.

In the backlight device disclosed in Patent Document 1 above, one end face of the light source substrate is disposed to face one side plate of the chassis in a parallel manner, and a connector is connected to the wiring pattern on an end portion of the light source substrate having that one end face. The connector is connected to the wiring pattern in a connecting direction that is a direction from the one side plate toward the one end face at a right angle to the one end face.

By connecting the connector to the wiring pattern in such a connecting direction, in the backlight device disclosed in Patent Document 1, the connector and power supply wiring lines are disposed between the one side plate and the one end face. Therefore, in order to house the connector connected to the wiring pattern and the power supply wiring lines extending from the connector within the chassis, it was necessary to provide a certain space between the one side plate and the one end face. However, if the space between the one side plate of the chassis and the one end face of the light source substrate is made larger, the width of the non-display region is also made larger, which did not allow the frame region of the backlight device to be made narrower.

SUMMARY OF THE INVENTION

The present invention was made taking into account the above-mentioned problems. An object of the present invention is to provide a technology that allows a frame region to be made narrower, in a direct illumination type illumination device in which power supply wiring lines are connected to a light source substrate at end portions thereof.

MEANS FOR SOLVING THE PROBLEMS

The present invention relates to a illumination device, including: a housing member that has a bottom plate and a side plate that rises from at least one of side edges of the bottom plate, the housing member having an aperture on top to transmit light; a light source substrate disposed on the bottom plate of the housing member such that one end face of the light source substrate faces the side plate; light sources disposed on the light source substrate such that light is emitted upward; patterned wiring disposed on the light source substrate and electrically connected to the light sources; a first connecting member electrically connected to the patterned wiring and disposed on, of end portions of the light source substrate, an end portion that has the one end face; a second connecting member electrically connected to the first connecting member in a connecting direction along a plane of the bottom surface, the connecting direction also being, in a plan view, a direction directed toward the side edge of the bottom plate where the side plate facing the one end face is disposed from a side opposite to the side edge across the first connecting member at an angle with respect to the side edge; and a power supply wiring line electrically connected to the second connecting member and supplying power to the light sources through the second connecting member, the first connecting member, and the patterned wiring.

According to the illumination device described above, the second connecting members are connected to the first connecting members from the side that is opposite to the first side edge of the side plate facing the one end faces. Therefore, it can be made so that the second connecting members do not need to be disposed between the side plate of the housing member and the one end faces of the light source substrates. Thus, the second connecting members do not make it difficult for the side plates of the housing member to be made closer to the one end faces of the respective light source substrates (the inner side of the housing member). Therefore, it is possible to relatively narrow the distance between the side plates of the housing member and the one end faces of the light source substrates, more than it is possible if the connecting direction is the direction toward the one side face from the first side edge at an right angle with the first side edge of the side plates facing the one end faces of the light source substrates. As a result, the frame region of the illumination device can be made even narrower. The connecting member is not limited to a connector. For example, the connecting member may be a card-type connector in which one connecting member is a terminal where electrode terminals are exposed, and the other connecting member can be connected to the terminal.

The bottom plate may have a horizontally long rectangular shape, and the side edges may be made of a pair of first side edges along a short side direction of the bottom plate and a pair of second side edges along a long side direction of the bottom plate, wherein a plurality of the light source substrates are disposed on the bottom surface, and the respective one end faces of the light source substrates face the side plates that rise from the first side edges, respectively, wherein the plurality of light source substrates each have the first connecting member disposed thereon, and wherein a plurality of the first connecting members each have the second connecting member connected thereto.

With this configuration, in the illumination device in which a plurality of light source substrates are disposed on the bottom plate, the distance between the side plates that rise from the first side edges and the respective one end faces of the light source substrates can be reduced, and the frame region of the illumination device can be made narrower.

All of a plurality of the second connecting members may be connected to the respective first connecting members in the same direction as each other.

With this configuration, when connecting the respective first connecting members to the respective second connecting members in the manufacturing process of the illumination device, all of the connecting work can be conducted in one direction.

The illumination device may be configured such that the plurality of light source substrates are aligned along the short side direction of the bottom plate, and wherein a plurality of second connecting members are connected to the respective first connecting members in connecting directions from the respective second side edges toward a center of the bottom plate in the short side direction.

With this configuration, when connecting the respective first connecting members and the respective second connecting members in the manufacturing process of the illumination device, it is possible to conduct the connecting work in two difference directions.

A wiring insertion opening that goes through the bottom plate and through which the power supply wiring line is inserted may be further provided, the wiring insertion opening being provided on a center of the bottom plate.

According to this configuration, in the center of the bottom plate it is possible to bundle the respective power supply wiring lines that extend from each second connecting member respectively connected to each first connecting member from the opposite side of the side plates facing the one end faces, and then to insert the power supply wiring lines through the wiring insertion openings. By doing this, it is possible to make it less likely that the power supply wiring lines will be disposed between the side plates and the light source substrates, and thus it will be possible to further reduce the distance between the side plates and the light source substrates, allowing for the frame region of the illumination device to be made even narrower.

The power supply wiring line may be connected to the second connecting member from a direction that is along the plane of the bottom plate and that is parallel to the second side edges in a plan view.

According to this configuration, it is possible to make it less likely that the power supply wiring lines will be disposed near the light sources, more than it is possible if the connecting direction of the power supply wiring lines to the second connecting members is the direction toward the one end face from the side opposite to the second side edge across the first connecting member, the direction also being orthogonal with the second side edge in a plan view. Therefore, when the power supply wiring lines are disposed in the housing member, it is possible to prevent and suppress the power supply wiring lines from being disposed on the side to which light is emitted of the light sources.

The plurality of light source substrates may form respective horizontally long quadrangular shapes, and the plurality of light source substrates may be disposed on the bottom plate in rows and columns such that both end faces of the short side thereof go along the first side edges, and such that both end faces of the long side thereof go along the second side edges, one of both end faces of the short side being designated as the one end face.

According to this configuration, the frame region of the illumination device can be narrowed, while realizing a illumination device in which a plurality of light source substrates are arranged in rows and columns inside the housing member.

The illumination device may further include diffusion lenses disposed on each of the plurality of light source substrates, the diffusion lenses covering light-emitting sides of the respective light sources and diffusing light from the light sources.

With this configuration, by having light from the light sources pass through the diffusion lenses, the light from the light sources is diffused, and the directivity thereof is lessened. Therefore, even when the number of light sources is reduced, a prescribed brightness can be maintained in the illumination device.

The illumination device may further include a reflective sheet that has a bottom section laid over the light source substrates, lens insertion holes disposed in the bottom section and having the diffusion lenses respectively inserted therethrough, and inclined sections that rise upward near the side plates of the housing member, wherein the light source substrates are disposed so that, among end portions thereof, an end portion that has the one end face is positioned between one of the inclined sections and one of the side plates rising from the first side edges.

With this configuration, light emitted from the light sources and travelling toward the inclined sections of the reflective sheet is not blocked by the first connecting members or the second connecting members, and therefore, it is possible to improve the light utilization efficiency of the light emitted from the light sources.

The second connecting member may be connected to the first connecting member in a direction forming an acute angle with respect to the side edge where the side plate facing the one end face is disposed, wherein the acute angle is in a range of 30° to 60°.

With this configuration, the second connecting member can be connected to the first connecting member with greater ease.

The light sources may be white light-emitting diodes.

With this configuration, it is possible to extend the life of the light sources and reduce the power consumption thereof.

The white light-emitting diodes may each be made of any one of combinations that include: a combination of a first light-emitting chip that emits blue light and a first light-emitting layer disposed around the first light-emitting chip and having a luminescence peak in a yellow region; a combination of the first light-emitting chip that emits blue light and a second light-emitting layer disposed around the first light-emitting chip and having luminescence peaks in a green region and a red region, respectively; a combination of the first light-emitting chip that emits blue light, a third light-emitting layer disposed around the first light-emitting chip and having a luminescence peak in a green region, and a second light-emitting chip that emits red light; a combination of the first light-emitting chip that emits blue light, the second light-emitting chip that emits red light, and a third light-emitting chip that emits green light; and a combination of a fourth light-emitting chip that emits ultraviolet light, and a fourth light-emitting layer disposed around the fourth light-emitting chip and having luminescence peaks in a blue region and a red region.

With this configuration, the color tone can be evened out as a whole, and illumination light with a substantially even color tone can be achieved.

The present invention can also be expressed as a display device that includes a display panel that conducts display using light from the above-mentioned illumination device. Also, a display device that uses a liquid crystal panel that uses liquid crystal as the display panel is novel and useful. A television receiver that includes the above-mentioned display device is also novel and useful.

Effects of the Invention

According to the present invention, it is possible to make a frame region narrower in a direct illumination type illumination device in which power supply wiring lines are connected to light source substrates at end portions thereof.

BRIEF DESCRIPTION OF THE DRAWINGS

FIG. 5 is an enlarged plan view of a CF substrate 11a.

DETAILED DESCRIPTION OF EMBODIMENTS

Embodiment 1

Figure 2:
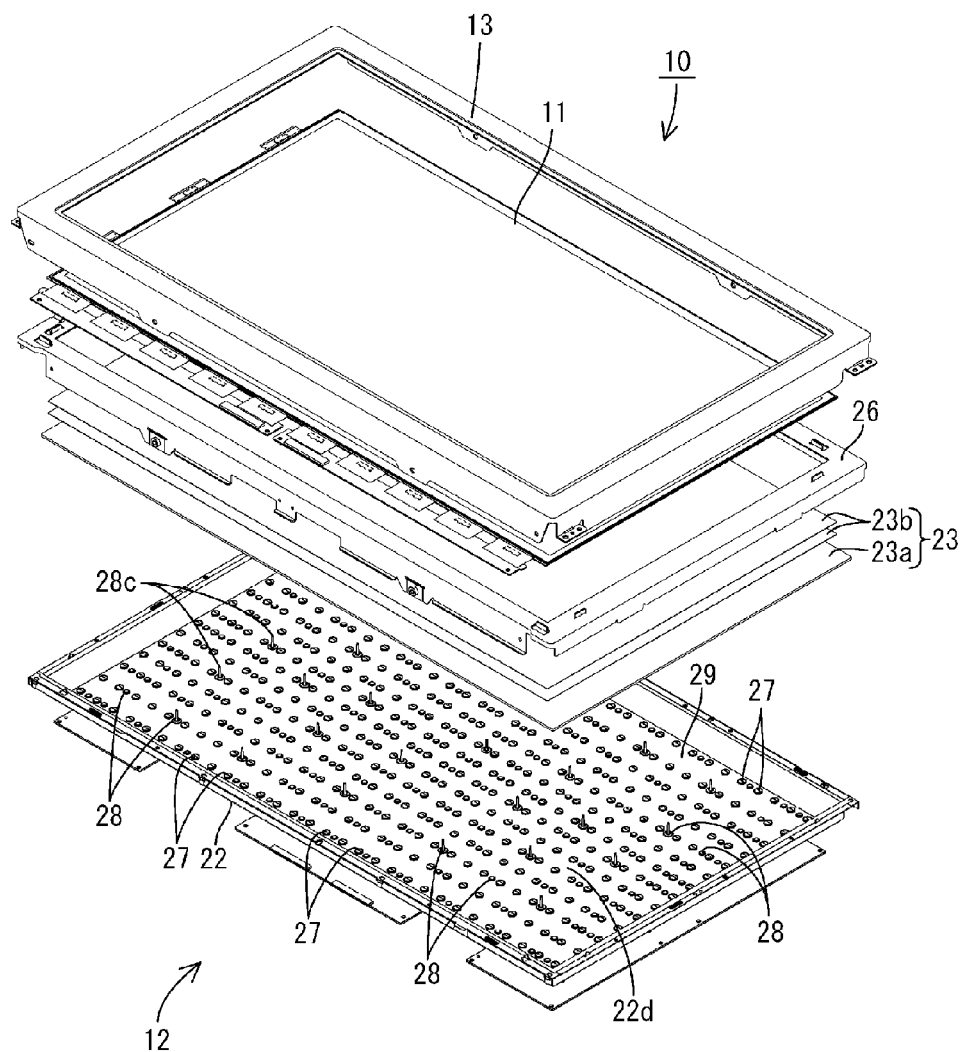
FIG. 2 is an exploded perspective view of a liquid crystal display device 10.
Figure 3:
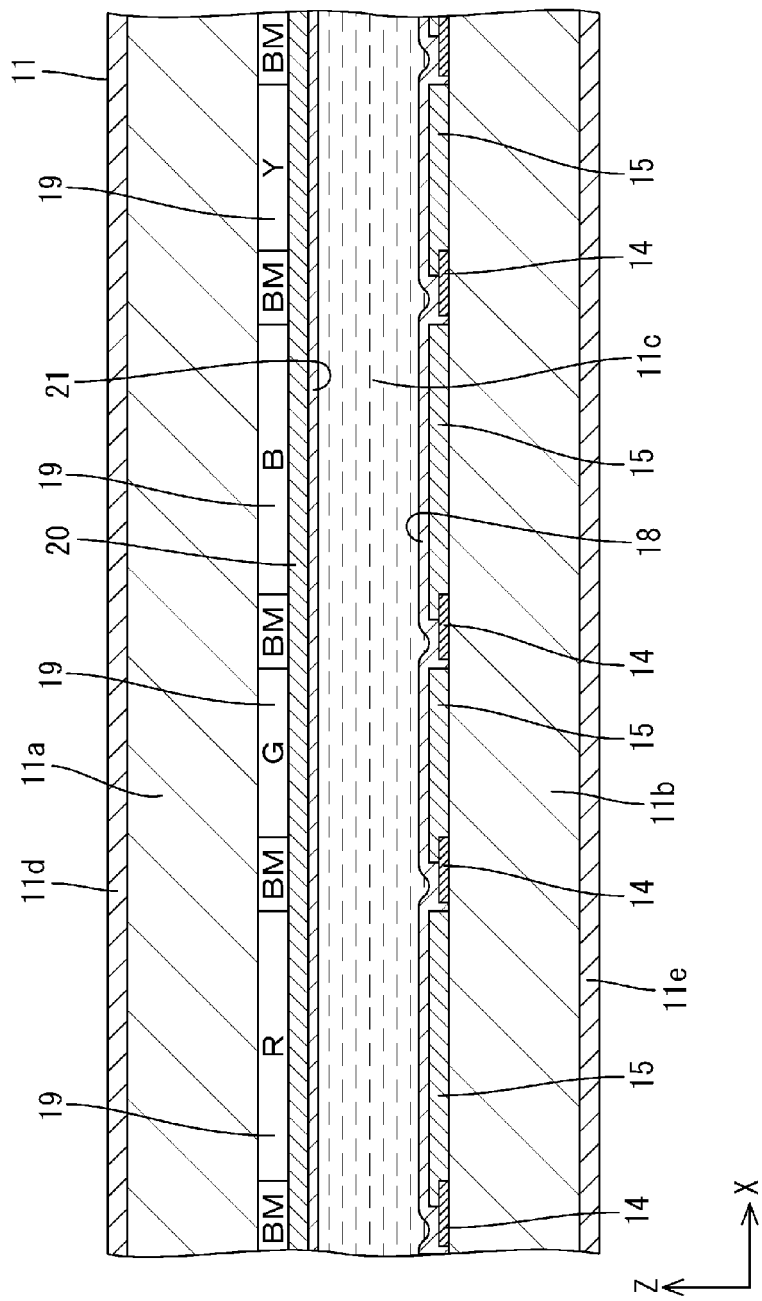
FIG. 3 is a cross-sectional view of a liquid crystal panel 11 along the long side direction.

Embodiment 1 will be described with reference to the drawings. In the present embodiment, a liquid crystal display device 10 will be described as an example. The drawings indicate an X axis, a Y axis, and a Z axis in a portion of the drawings, and each of the axes indicates the same direction for the respective drawings. The top side of FIGS. 2 and 3 is the front side, and the bottom side of FIGS. 2 and 3 is the rear side.

(Television Receiver)

Figure 1:
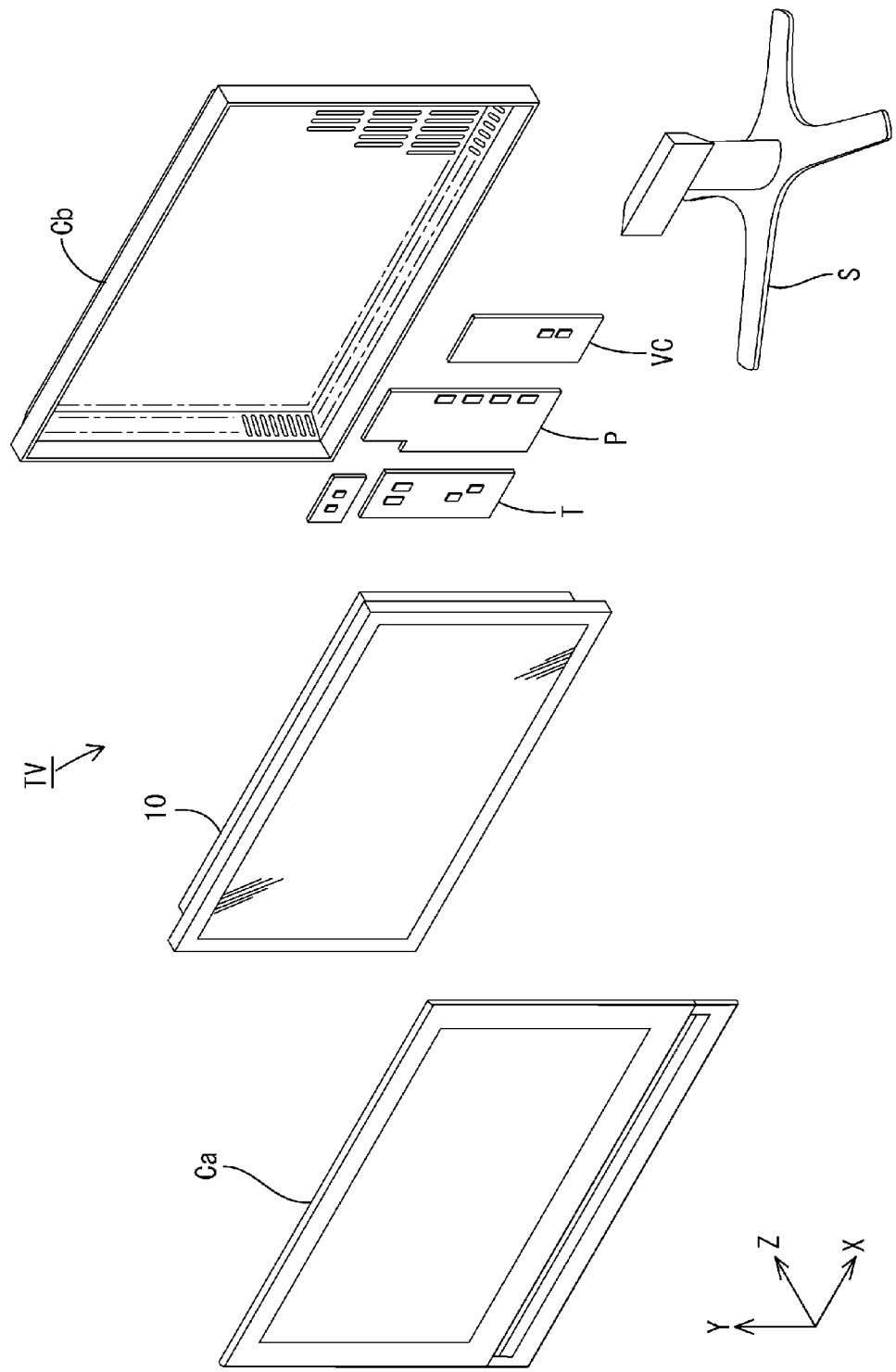
FIG. 1 is an exploded perspective view of a television receiver TV according to Embodiment 1.

As shown in FIG. 1, a television receiver TV according to the present embodiment includes a liquid crystal display device 10 that is a display device, front and rear cabinets Ca and Cb that store the liquid crystal display device 10 by sandwiching it therebetween, a power supply circuit substrate P for supplying power, a tuner (receiving part) T that can receive television image signals, an image conversion circuit substrate VC that converts the television image signals outputted from the tuner T to image signals for the liquid crystal display device 10, and a stand S.

The liquid crystal display device 10 is formed in a horizontally long quadrangular (rectangular) shape as a whole, and is disposed such that the long side direction thereof matches the horizontal direction (X axis direction) and the short side direction thereof matches the vertical direction (Y direction), respectively. As shown in FIG. 2, the liquid crystal display device 10 includes a liquid crystal panel 11 that is a display panel, and a backlight device (an example of a illumination device) 12 that is an external light source, and these are held together as one component by a frame-shaped bezel 13 and the like.

(Liquid Crystal Panel)

A configuration of the liquid crystal panel 11 in the liquid crystal display device 10 will be explained. The liquid crystal panel 11 is formed in a horizontally long quadrangular (rectangular) shape as a whole, and, as shown in FIG. 3, includes a pair of transparent (having light transmittance) glass substrates 11a and 11b, and a liquid crystal layer 11c disposed between the two substrates 11a and 11b and including liquid crystal that is a substance that changes optical characteristics thereof as a result of being applied with an electric field. The two substrates 11a and 11b are bonded to each other by a not-shown sealing agent while maintaining a gap that corresponds to the thickness of the liquid crystal layer. On the respective outer surfaces of the two substrates 11a and 11b, polarizing plates 11d and 11e are bonded. The long side direction of the liquid crystal panel 11 matches the X axis direction, and the short side direction thereof matches the Y axis direction.

Figure 4:
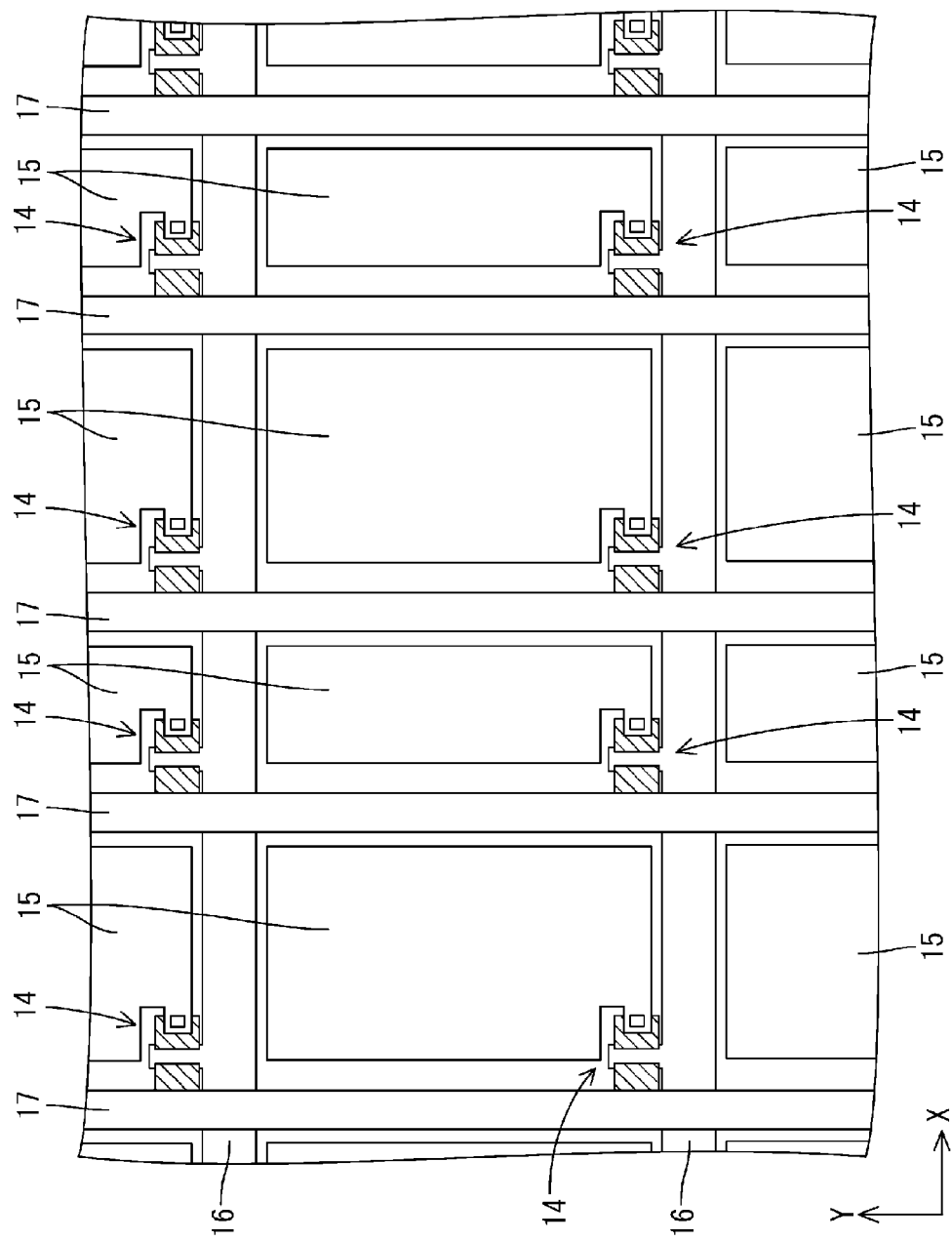
FIG. 4 is an enlarged plan view of an array substrate 11b.

Of the two substrates 11a and 11b, one on the front side (front surface side) is a CF substrate 11a, and the other on the rear side (rear surface side) is an array substrate 11b. As shown in FIG. 4, on the inner surface of the array substrate 11b, or in other words, on a surface thereof on the side of the liquid crystal layer 11c (side facing the CF substrate 11a), a plurality of TFTs (thin film transistors) 14 that are switching elements and a plurality of pixel electrodes 15 are arranged in a matrix (rows and columns), and gate wiring lines 16 and source wiring lines 17 are disposed in a grid pattern so as to surround the respective TFTs 14 and pixel electrodes 15. Each pixel electrode 15 has a vertically long quadrangular (rectangular) shape with the long side direction matching the Y axis direction and the short side direction matching the X axis direction, and is made of a transparent electrode such as ITO (indium tin oxide) or ZnO (zinc oxide). The gate wiring lines 16 and the source wiring lines 17 are respectively connected to the gate electrodes and the source electrodes of the TFTs 14, and the pixel electrodes 15 are connected to the drain electrodes of the TFTs 14, respectively. As shown in FIG. 3, an alignment film 18 for defining the orientation of liquid crystal molecules is disposed on the TFTs 14 and the pixel electrodes 15 on the side facing the liquid crystal layer 11c. In an end portion of the array substrate 11b, terminals that are led out from the gate wiring lines 16 and the source wiring lines 17 are formed, and a not-shown driver part for driving liquid crystal is crimp-connected to these terminals through an anisotropic conductive film (ACF). The driver part for driving liquid crystal is electrically connected to a not-shown display control circuit substrate through various wiring substrates and the like. The display control circuit substrate is connected to the image conversion circuit substrate VC in the television receiver TV (see FIG. 1), and supplies driving signals to the respective wiring lines 16 and 17 through the driver part in accordance with output signals from the image conversion circuit substrate VC.

Figure 5:
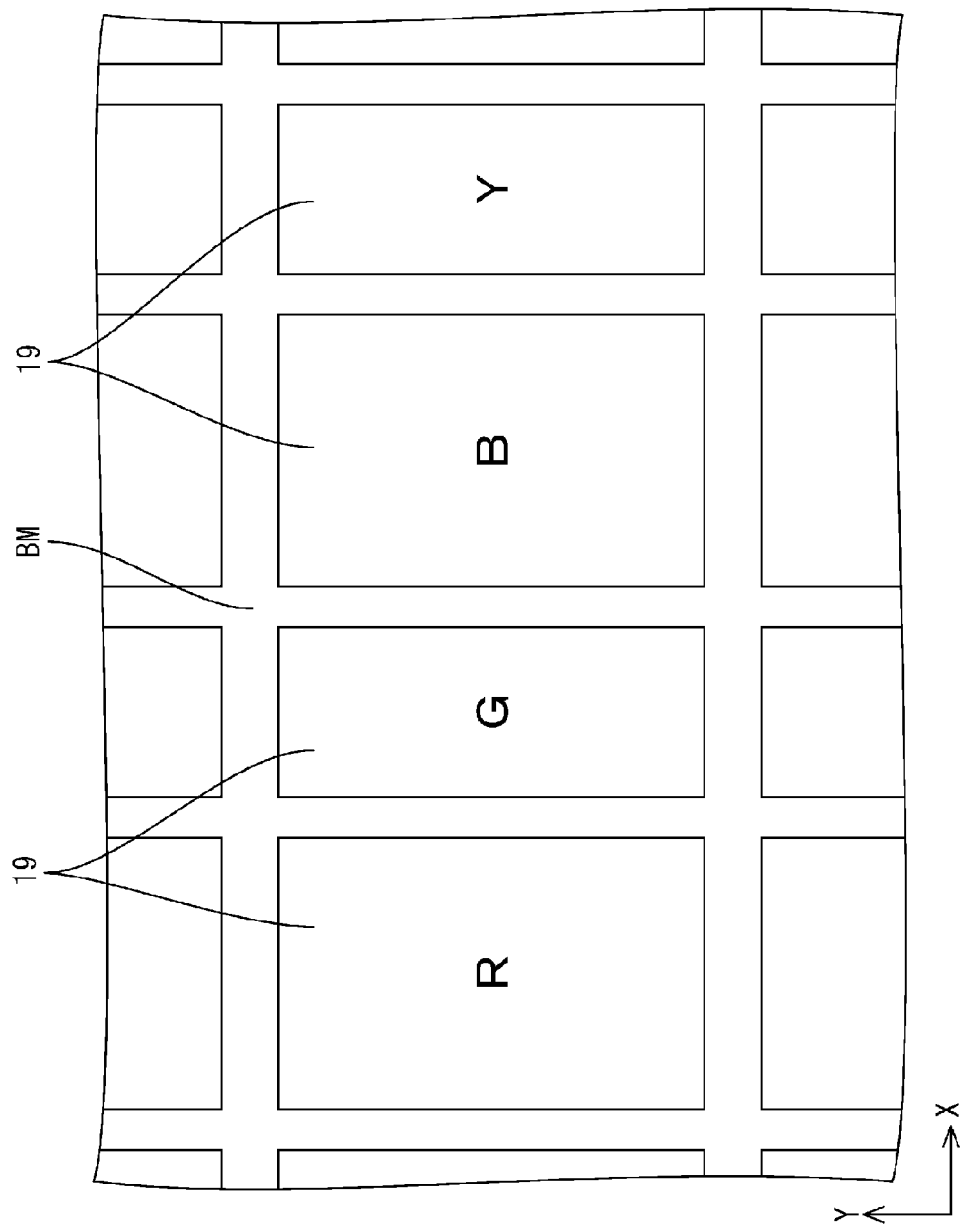

On the other hand, as shown in FIG. 5, on an inner surface of the CF substrate 11a, or in other words, on a surface thereof on the side of the liquid crystal layer 11c (side facing the array substrate 11b), color filters 19 made of a plurality of colored portions R, G, B, and Y arranged in a matrix (rows and columns) so as to face the respective pixels on the array substrate 11b are formed. The color filters 19 of the present embodiment include yellow colored portions Y in addition to red colored portions R, green colored portions G, and blue colored portions B, which are the three primary colors of light, and the respective colored portions R, G, B, and Y selectively transmit light of the corresponding colors (corresponding wavelengths). Each of the colored portions R, G, B, and Y is formed in a vertically long quadrangular (rectangular) shape with the long side direction matching the Y axis direction and the short side direction matching the X axis direction, respectively, in a manner similar to the pixel electrodes 15. A grid-shaped light-shielding layer (black matrix) BM is disposed between the respective colored portions R, G, B, and Y to prevent the colors from being mixed. As shown in FIG. 3, in the CF substrate 11a, an opposite electrode 20 and an alignment film 21 are formed in this order on the surface of the color filters 19 facing the liquid crystal layer 11c.

The arrangement and size of the respective colored portions R, G, B, and Y constituting the color filters 19 will be explained in detail. As shown in FIG. 5, the respective colored portions R, G, B, and Y are arranged in rows and columns with the X axis direction being the row direction and the Y axis direction being the column direction. The dimension of the respective colored portions R, G, B, and Y in the column direction (Y axis direction) is identical to each other, but the dimension thereof in the row direction (X axis direction) differs from each other among the respective colored portions R, G, B, and Y. Specifically, the respective colored portions R, G, B, and Y are arranged such that a red colored portion R, a green colored portion G, a blue colored portion B, and a yellow colored portion Y are aligned along the row direction in this order from the left side of FIG. 5, and the dimension of the red colored portion R and the blue colored portion B in the row direction is relatively large compared to the dimension of the yellow colored portion Y and the green colored portion G in the row direction. In other words, the colored portions R and B, which have relatively large row direction dimensions, and the colored portions G and Y, which have relatively small row direction dimensions, are arranged repeatedly in an alternating fashion with respect to the row direction. Accordingly, the area of the red colored portion R and the blue colored portion B is larger than the area of the green colored portion G and the yellow colored portion Y. The area of the blue colored portion B and the area of the red colored portion R are equal to each other. Similarly, the area of the green colored portion G and the area of the yellow colored portion Y are equal to each other. FIGS. 3 and 5 show a case in which the area of the red colored portions R and the blue colored portions B is approximately 1.6 times larger than the area of the yellow colored portions Y and the green colored portions G.

As a result of the color filters 19 having the above-mentioned configuration, in the array substrate 11b, as shown in FIG. 4, the dimension of the pixel electrodes 15 in the row direction (X axis direction) differs from each other among respective columns. In other words, with respect to the row direction, the size and area of pixel electrodes 15 that face the red colored portion R and the blue colored portion B are larger than the dimension and area of pixel electrodes 15 that face the yellow colored portion Y and the green colored portion G. The gate wiring lines 16 are all arranged at an equal pitch, while the source wiring lines 17 are arranged at two different pitches corresponding to the dimensions of the pixel electrodes 15 in the row direction.

As described above, because the liquid crystal display device 10 according to the present embodiment uses the liquid crystal panel 11 that has the color filters 19 made of four colored portions R, G, B, and Y, the television receiver TV is provided with a special image conversion circuit substrate VC as shown in FIG. 1. In other words, this image conversion circuit substrate VC can convert the television image signals outputted from the tuner T into image signals of respective colors of blue, green, red, and yellow, and can output the generated image signals of the respective colors to the display control circuit substrate. The display control circuit substrate drives TFTs 14 provided for pixels of respective colors in the liquid crystal panel 11 through the respective wiring lines 16 and 17, based on these image signals, thereby appropriately controlling the transmission of light that passes through the respective colored portions R, G, B, and Y of the respective colors.

(Backlight Device)

Next, a configuration of the backlight device 12 of the liquid crystal display device 10 will be explained. As shown in FIG. 2, the backlight device 12 includes a chassis 22 in a substantially box shape that has a light-exiting opening 22d on the side toward which light is emitted (liquid crystal panel 11 side), optical members 23 disposed to cover the light-exiting opening 22d of the chassis 22, and a frame 26 disposed along the outer edges of the chassis 22 and holding the optical members 23 by sandwiching outer edges thereof with the chassis 22. The chassis 22 includes LEDs 24 disposed immediately below the optical members 23 (liquid crystal panel 11) so as to face the optical members 23, LED substrates 25 on which the LEDs 24 are mounted, and diffusion lenses 27 attached to the LED substrates 25 in positions where the LEDs 24 are disposed. Accordingly, the backlight device 12 of the present embodiment is a so-called direct illumination type. The chassis 22 further includes holding members 28 that can hold the LED substrates 25 on the chassis 22, and a reflective sheet 29 that reflects light inside of the chassis 22 toward the optical members 23. Next, each component of the backlight device 12 will be described in detail below.

(Chassis)

Figure 6:
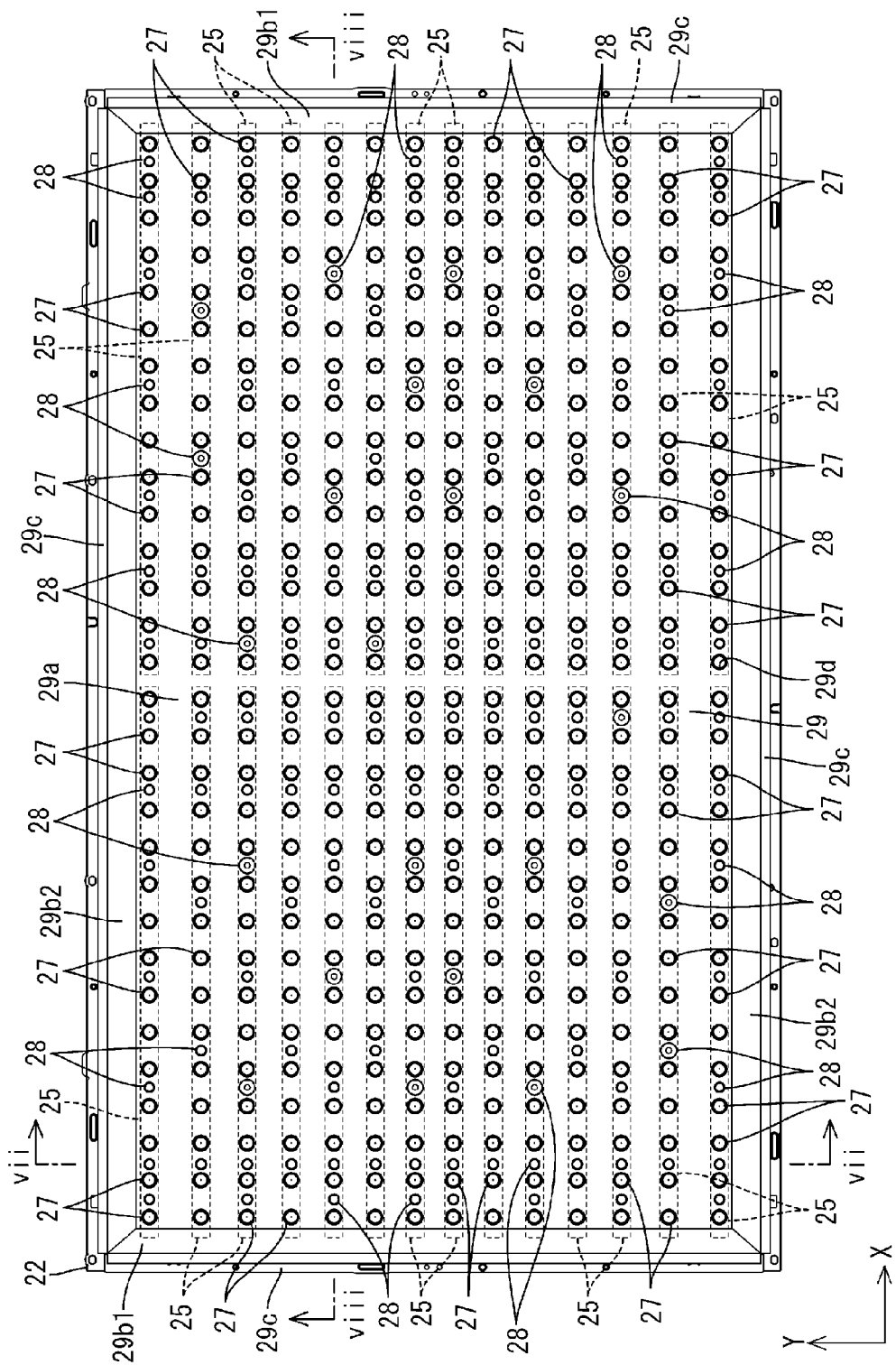
FIG. 6 is a plan view showing an arrangement of diffusion lenses 27, LED substrates 25, supporting members 28, and the like in a chassis 22 for a backlight device 12.
Figure 7:
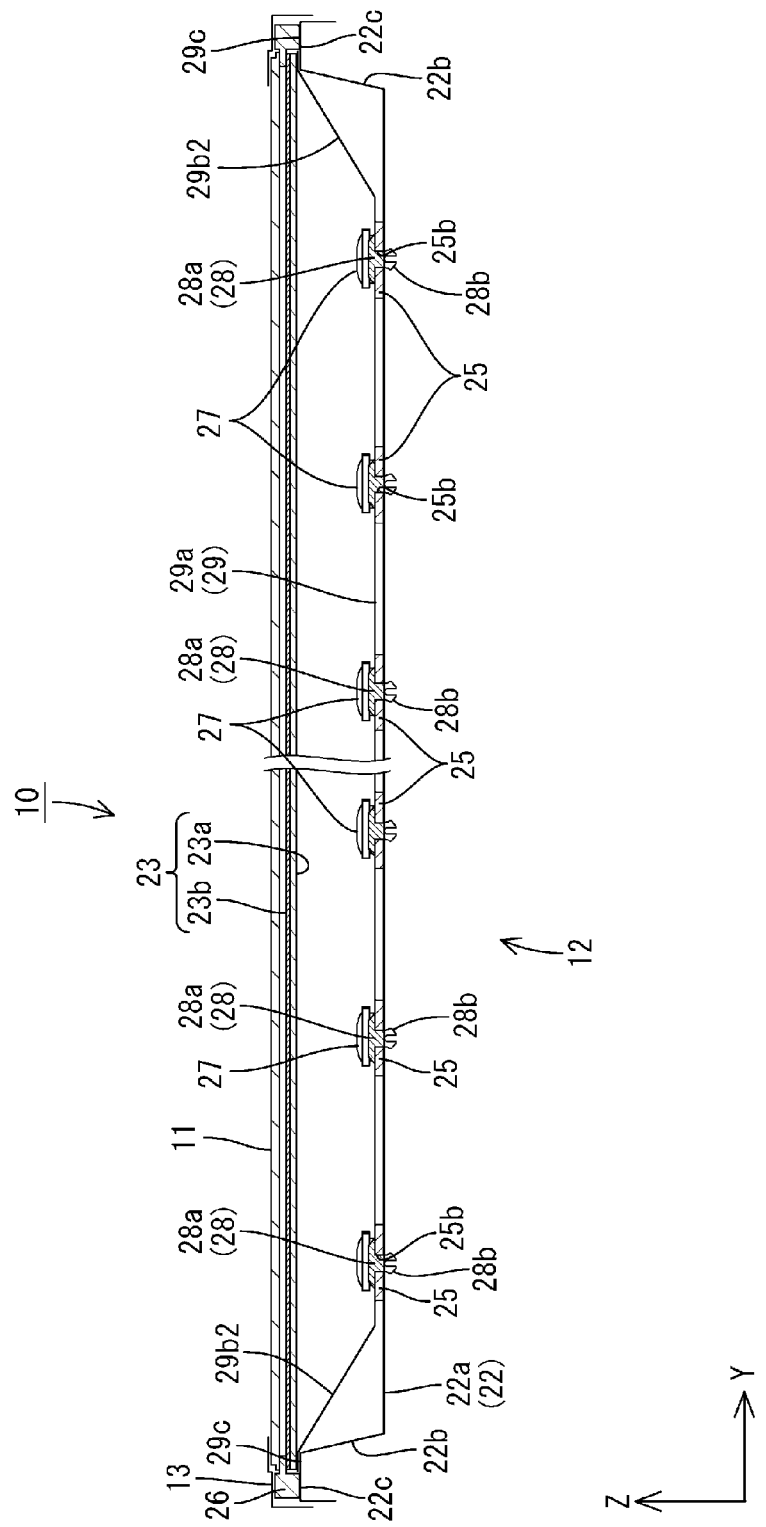
FIG. 7 is a cross-sectional view of the liquid crystal display device 10 along the short side direction.
Figure 8:
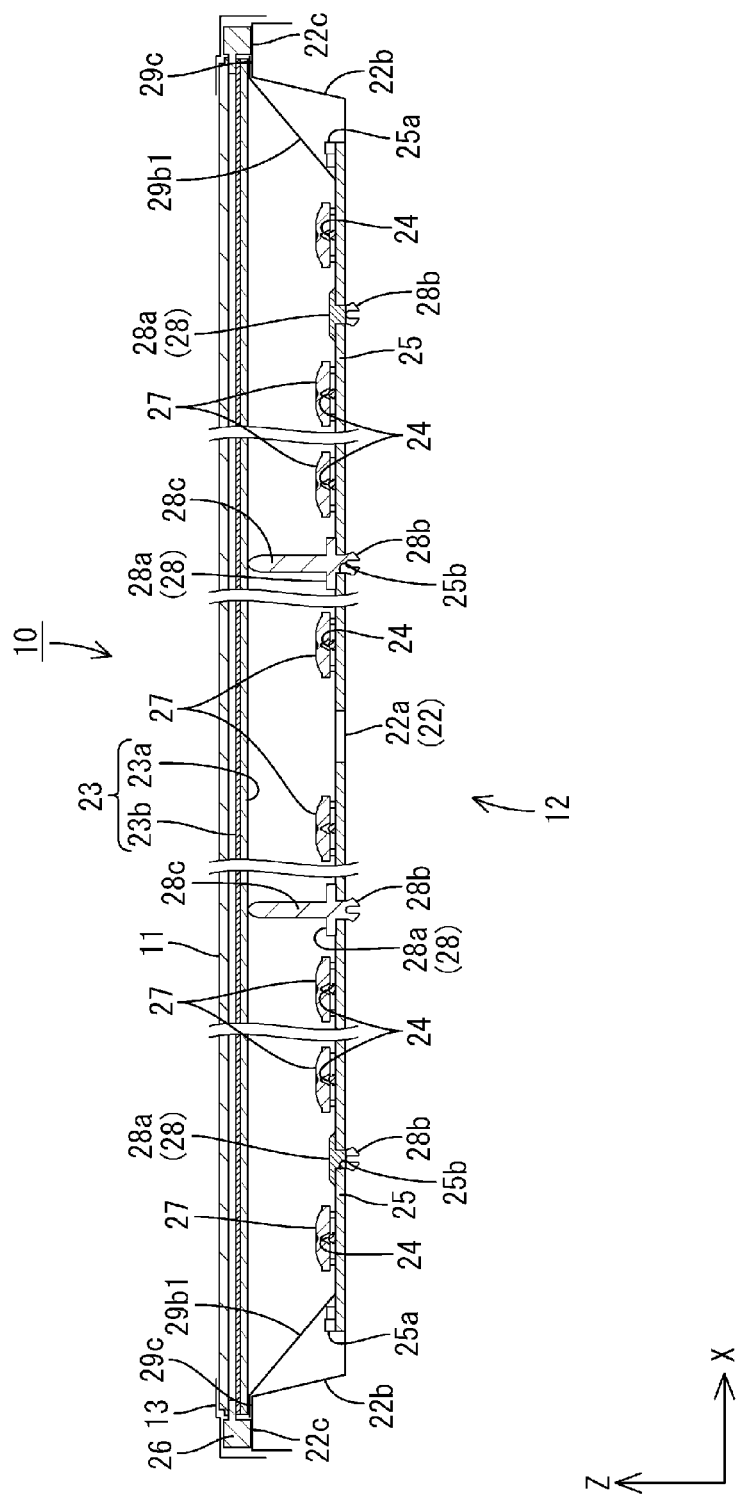
FIG. 8 is a cross-sectional view of the liquid crystal display device 10 along the long side direction.

The chassis 22 is made of a metal, and as shown in FIGS. 6 to 8, includes a bottom plate 22a of a horizontally long quadrangular (rectangular) shape in a manner similar to the liquid crystal panel 11, and side plates 22b that rise from outer edges on the respective sides (a pair of long sides and a pair of short sides) of the bottom plate 22a toward the front side (the side toward which light is emitted). The chassis 22 is formed in a substantially shallow box shape that opens toward the front side as a whole. The side edges of the bottom plate 22a of the chassis 22 include first side edges 22a1, which are side edges on the pair of short sides, and second side edges 22a2, which are side edges on the pair of long sides (see FIG. 9). In the chassis 22, the long side direction thereof matches the X axis direction (horizontal direction), and the short side direction thereof matches the Y axis direction (vertical direction). The frame 26 and the optical members 23, which will be described below, can be placed, from the front side, on respective supporting plates 22c of the chassis 22. The frame 26 is attached to the respective supporting plates 22c with screws. The bottom plate 22a of the chassis 22 has formed therein openings that are attachment holes 22d for attaching the holding members 28. A plurality of attachment holes 22d are dispersed throughout the bottom plate 22a in positions where the holding members 28 are to be attached.

(Optical Members)

As shown in FIG. 2, the optical members 23 are in a horizontally long rectangular shape in a plan view, as in the liquid crystal panel 11 and the chassis 22. As shown in FIGS. 7 and 8, the outer edges of the optical members 23 are placed on the supporting plates 22c, thereby covering the light-exiting opening 22d of the chassis 22 and being interposed between the liquid crystal panel 11 and the LEDs 24 (LED substrates 25). The optical members 23 include a diffusion plate 23a disposed on the rear side (LEDs 24 side, opposite to the side toward which light is emitted), and optical sheets 23b disposed on the front side (liquid crystal panel 11 side, the side toward which light is emitted). The diffusion plate 23a has a configuration in which a plurality of diffusion particles are dispersed inside a plate-shaped base material made of an almost completely transparent resin having a prescribed thickness, and has the function of diffusing light that is transmitted through. The optical sheets 23b are thinner than the diffusion plate 23a, and two optical sheets 23b are layered, one on top of the other. Specific types of optical sheets 23b include a diffusion sheet, a lens sheet, a reflective polarizing sheet, and the like, for example, and it is possible to appropriately choose any of these as optical sheets 23b.

(Frame)

As shown in FIG. 2, the frame 26 is formed in a frame shape along the outer edges of the liquid crystal panel 11 and the optical members 23. The outer edges of the optical members 23 can be sandwiched between the frame 26 and the respective supporting plates 22c (see FIGS. 7 and 8). The frame 26 receives the outer edges of the liquid crystal panel 11 from the rear side thereof, and can sandwich the outer edges of the liquid crystal panel 11 with the bezel 13 that is disposed on the front side (see FIGS. 7 and 8).

(LEDs)

As shown in FIG. 6, the LEDs 24 are mounted on the LED substrate 25, and are so-called top type LEDs in which light-emitting surfaces are on the side opposite to the mounting surface that is mounted on the LED substrate 25. Each LED 24 includes an LED chip 24a that is a light-emitting source that emits blue light, and a green phosphor and a red phosphor as phosphors that emit light by being excited by the blue light. Specifically, each LED 24 has a configuration in which an LED chip 24a made of an InGaN type material, for example, is sealed by a resin material onto a base plate that is attached to the LED substrate 25. The LED chip 24a mounted on the base plate has a primary luminescence wavelength in a range of 420 nm to 500 nm, i.e., the blue wavelength region, and can emit highly pure blue light (blue single color light). The specific primary luminescence wavelength of the LED chip 24a is preferably 451 nm, for example. The resin material that seals in the LED chip 24a includes a green phosphor and a red phosphor mixed therein with a prescribed ratio. The green phosphor emits green light by being excited by the blue light emitted from the LED chip 24a, and the red phosphor emits red light by being excited by the blue light emitted from the LED chip 24a. By the blue light (light having a blue component) emitted from the LED chip 24a, the green light (light having a green component) emitted from the green phosphor, and the red light (light having a red component) emitted from the red phosphor, the LED 24 can emit light of a prescribed color as a whole such as white light or white light with a bluish tone, for example. Because yellow light can be obtained by mixing the light from the green phosphor having a green component and the light from the red phosphor having a red component, it can also be said that this LED 24 has both the blue component light from the LED chips 24a and the yellow component light. The chromaticity of the LED 24 changes based on the absolute value or the relative value of the quantity of green phosphor and red phosphor included, for example, and thus, it is possible to adjust the chromaticity of the LED 24 by appropriately adjusting the amount of green phosphor and red phosphor included. In the present embodiment, the green phosphor has a primary luminescence peak in the green wavelength region from 500 nm to 570 nm inclusive, and the red phosphor has a primary luminescence peak in the red wavelength region from 600 nm to 780 nm inclusive.

Next, the green phosphor and the red phosphor included in the LED 24 will be explained in detail. It is preferable that β-SiAlON, which is a type of SiAlON phosphor, be used as the green phosphor. The SiAlON type phosphor is a substance obtained by replacing some of silicon atoms of silicon nitride with aluminum atoms, and by replacing some of the nitrogen atoms thereof with oxygen atoms; in other words, the SiAlON is a nitride. The SiAlON phosphor that is a nitride has superior light-emitting efficiency and durability to those of other phosphors made of a sulfide or an oxide, for example. Here, "having superior durability" specifically means that the brightness is less likely to deteriorate over time even after being exposed to high-energy exciting light from the LED chip. In the SiAlON phosphor, a rare earth element (such as Tb, Yg, or Ag) is used as an activator. β-SiAlON that is a type of the SiAlON type phosphor is a substance represented by a general formula of $Si_6$-zAlzOzN:Eu (z represents the solid solubility) or $(Si,Al)_6(O, N)_6$:Eu in which aluminum and oxygen are dissolved in β-type silicon nitride crystal. In the β-SiAlON of the present embodiment, Eu (europium) is used as the activator, for example, and because the use of Eu contributes to high purity in the color green that is fluorescent light, it is very useful to adjust the chromaticity of the LED 24. On the other hand, it is preferable to use CASN that is a type of CASN type phosphor as the phosphor. The CASN type phosphor is a nitride that includes calcium atoms (Ca), aluminum atoms (Al), silicon atoms (Si), and nitrogen atoms (N), and has superior light-emitting efficiency and durability compared to other phosphors made of sulfide or oxide, for example. In the CASN type phosphor, a rare earth element (such as Tb, Yg, or Ag) is used as an activator. CASN that is a type of the CASN type phosphor includes Eu (europium) as an activator, and is represented by a compositional formula of $CaAlSiN_3$:Eu.

(LED Substrate)

As shown in FIG. 6, the LED substrate 25 has a base member that is in a horizontally long rectangular shape in a plan view, and is housed in the chassis 22 so as to extend along the bottom plate 22a with the long side direction thereof matching the X axis direction and the short side direction thereof matching the Y axis direction. Of plate surfaces of the base member of the LED substrate 25, a surface facing the front side (surface facing the optical members 23) has the LEDs 24 mounted thereon. The LEDs 24 are disposed such that the light-emitting surfaces face the optical members 23 (liquid crystal panel 11) and such that the optical axis thereof matches the Z axis direction, or in other words, the direction perpendicular to the display screen of the liquid crystal panel 11. A plurality of LEDs 24 are arranged in a row along the long side direction (X axis direction) of the LED substrate 25, and are connected to each other in series through a wiring pattern (an example of connecting wiring) 35 (see FIG. 9) formed on the LED substrate 25. The pitch at which the respective LEDs 24 are arranged is substantially constant, which means that the respective LEDs 24 are arranged at substantially even intervals.

As shown in FIG. 6, a plurality of LED substrates 25 having the above-mentioned configuration are disposed in the chassis 22 along the X axis direction and the Y axis direction, respectively, such that the respective long sides are aligned along the same direction and the respective short sides aligned along the same direction. That is, the LED substrates 25 and the LEDs 24 mounted thereon are arranged in rows and columns (matrix arrangement, two-dimensional arrangement) with the X axis direction (long side direction of the chassis 22 and the LED substrate 25) being the row direction, and the Y axis direction (short side direction of the chassis 22 and the LED substrate 25) being the column direction, respectively, in the chassis 22. Specifically, in the chassis 22, a total of 28 LED substrates 25 are disposed in an arrangement with two aligned in the X axis direction and fourteen aligned in the Y axis direction. Of two end portions of each LED substrate 25 along the long side direction, an end portion adjacent to the outer edge of the chassis 22 (end portion on the side opposite to an adjacent LED substrate 25 in the X axis direction) has a first connector (an example of a first connecting member) 31 and a second connector (an example of a second connecting member) 32 disposed therein. By the second connector 32 being electrically connected to a connecting part of an external LED driver circuit through a power supply wiring line 38, power is supplied to each LED 24, and the driving of the LEDs 24 can be controlled. The pitch at which the respective LED substrates 25 are arranged along the Y axis direction is substantially even. Therefore, the respective LEDs 24 disposed two-dimensionally along the bottom plate 22a in the chassis 22 are arranged at substantially even intervals in the X axis direction and in the Y axis direction, respectively.

The base member of the LED substrate 25 is made of the same metal material as the chassis 22 such as an aluminum material, and on the surface thereof, the above-mentioned wiring pattern 35 is formed by using a metal film such as a copper foil through an insulating layer. On the outermost surface of the LED substrate 25, a reflective layer (not shown) of a highly reflective white is formed. As a result of this wiring pattern 35, the respective LEDs 24 arranged in a row on the respective LED substrates 25 are connected to each other in series. It is also possible to use an insulating material such as a ceramic as the base material for the LED substrates 25.

(Diffusion Lens)

The diffusion lenses 27 are made of a synthetic resin material (such as polycarbonate or acrylic) that is almost completely transparent (having a high light transmittance) and that has a refractive index higher than air. As shown in FIGS. 6 to 8, the diffusion lenses 27 have a prescribed thickness and are each formed in a substantially circular shape in a plan view. Each of the diffusion lenses 27 is attached to the LED substrate 25 so as to cover the front side of an LED 24, or in other words, so as to be placed over an LED 24 in a plan view. The diffusion lens 27 diffuses light from the LED 24 that has great directivity as the light passes therethrough. That is, the directivity of the light emitted from the LED 24 is lessened as the light passes through the diffusion lens 27, and therefore, even when a gap between adjacent LEDs 24 is made larger, an area therebetween becomes less likely to be recognized as a dark area. This makes it possible to reduce the number of LEDs 24 that need to be provided. The diffusion lenses 27 are positioned such that the respective centers thereof substantially match the centers of the respective LEDs 24 in a plan view. FIG. 7 shows a cross-sectional configuration of the holding members 28, and therefore, in terms of the diffusion lenses 27, the side faces of the diffusion lenses 27 that are positioned behind the holding members 28 on the page are shown.

(Holding Member)

The holding members 28 will be explained. The holding members 28 are made of a synthetic resin such as polycarbonate, and the surfaces thereof are a highly reflective white. As shown in FIGS. 6 to 8, the holding members 28 each have a main part 28a along the plane of the LED substrate 25 and a fixing part 28b that protrudes from the main part 28a toward the rear side, or in other words, toward the chassis 22 and that is attached to the chassis 22. The main part 28a is formed in a substantially circular plate shape in a plan view, and can sandwich at least the LED substrate 25 with the bottom plate 22a of the chassis 22. The fixing part 28b can be attached to the bottom plate 22a by being inserted through an insertion hole 25b and an attachment hole that are respectively formed in the LED substrate 25 and the bottom plate 22a of the chassis 22 in a position corresponding to where each holding member 28 is to be attached. As shown in FIG. 6, a plurality of holding members 28 are appropriately dispersed throughout the surface of the LED substrate 25, and are adjacent to the respective diffusion lenses 27 (LEDs 24) with respect to the X axis direction.

As shown in FIGS. 6 to 8, the holding members 28 include two types of holding members: first holding members that hold the LED substrates 25 between the main parts 28a and the bottom plate 22a of the chassis 22 without having a bottom section 29a of the reflective sheet 29 therebetween; and second holding members that hold the LED substrates 25 and the bottom section 29a of the reflective sheet 29 between the main parts 28a and the bottom plate 22a of the chassis 22. Among them, the holding members 28 that hold the LED substrates 25 and the bottom section 29a of the reflective sheet 29 (second holding members) include two types: holding members provided with supporting parts 28c that protrude from the main parts 28a toward the front side; and holding members that do not have the supporting parts 28c. The supporting parts 28c can support the optical members 23 (diffusion plate 23a directly) from the rear side thereof, thereby maintaining the positional relationship between the LEDs 24 and the optical members 23 in the Z axis direction and preventing the optical members 23 from being deformed inadvertently.

(Reflective Sheet)

The reflective sheet 29 is made of a synthetic resin, and the surface thereof is a highly reflective white. As shown in FIGS. 6 to 8, the reflective sheet 29 is large enough to be laid over almost the entire inner surface of the chassis 22, and therefore, it is possible to cover all of the LED substrates 25 arranged in rows in the chassis 22 from the front side thereof. With the reflective sheet 29, light inside of the chassis 22 can be efficiently directed toward the optical members 23. The reflective sheet 29 has: the bottom section 29a disposed along the bottom plate 22a of the chassis 22 and having a size that can cover the large part of the bottom plate 22a; first inclined sections 29b1 that rise from the outer edges on the short sides of the bottom section 29a toward the front side while being inclined toward the bottom section 29a; second inclined sections 29b2 that rise from the outer edges on the long sides of the bottom section 29a toward the front side while being inclined toward the bottom section 29a; and extension sections 29c that extend respectively from the outer edges of the inclined sections 29b1 and 29b2 toward the outside and that are placed on the supporting plates 22c of the chassis 22. The reflective sheet 29 is disposed such that the bottom section 29a thereof faces the front side surfaces of the respective LED substrates 25, or in other words, is disposed so as to be in the front with respect to the mounting surfaces of the LEDs 24. The bottom section 29a of the reflective sheet 29 has lens insertion holes 29d through which the respective diffusion lenses 27 are inserted in positions corresponding to the respective diffusion lenses 27 (respective LEDs 24) in a plan view.

The bottom section 29a also has openings that are holding member insertion holes through which the fixing parts 28b are inserted in positions corresponding to the respective holding members 28 in a plan view, and the holding member insertion holes for the holding members 28 that hold the LED substrates 25 without having the bottom section 29a therebetween (first holding members), in particular, are formed to be large enough to allow the main parts 28a thereof to also pass through. In this way, the LED substrates 25 placed in the chassis 22 can be affixed to the bottom plate 22a of the chassis 22 by the holding members 28 (first holding members) in advance, and when placing the reflective sheet 29 inside of the chassis 22 thereafter, it is possible to prevent the bottom section 29a from riding on the main parts 28a of these holding members 28 (first holding members). The bottom section 29a is affixed to the chassis 22 together with the LED substrates 25 by the holding members 28 (second holding members) that are attached after the reflective sheet 29 is placed inside the chassis 22, thereby preventing the reflective sheet 29 from being raised or warped.

(Purposes of Having Four Primary Colors in Liquid Crystal Panel and Differentiating Areas of Respective Colored Portions of Color Filters)

As already discussed above, the color filters 19 of the liquid crystal panel 11 of the present embodiment have the yellow colored portions Y, in addition to the respective colored portions R, G, and B, which are the three primary colors of light, as shown in FIGS. 3 and 5. Therefore, the color gamut of the display image displayed by the transmitted light is increased, thereby making it possible to realize the display with excellent color reproducibility. In addition, because the light that is transmitted through the yellow colored portions Y has a wavelength close to the luminosity peak, it tends to be perceived by human eyes as bright light even with a small amount of energy. As a result, even if the power output of the LEDs 24 in the backlight device 12 is reduced, the sufficient brightness can be obtained, thereby achieving effects such as a reduction in power consumption of the LEDs 24 and thus excellent environmental performance.

On the other hand, when using the liquid crystal panel 11 having four primary colors as described above, the display image on the liquid crystal panel 11 tends to have a yellowish tone as a whole. In order to avoid this, in the backlight device 12 of the present embodiment, the chromaticity of the LEDs 24 is adjusted to have a bluish tone, blue being a complementary color of yellow, such that the chromaticity of the display image is corrected. For this reason, the LEDs 24 provided in the backlight device 12 have the primary luminescence wavelength in the blue wavelength region as mentioned above, and emit light in the blue wavelength region at the highest intensity.

The research conducted by the inventor of the present invention shows that, when adjusting the chromaticity of the LEDs 24 as described above, as the chromaticity is made closer from white to blue, the brightness of the emitted light tends to be lowered. Thus, in the present embodiment, the area of the blue colored portions B in the color filters 19 is made larger than the area of the green colored portions G and the yellow colored portions Y, which makes it possible to include more blue light, which is the complementary color of yellow, in the transmitted light of the color filters 19. This way, when adjusting the chromaticity of the LEDs 24 to correct the chromaticity of the display image, it is not necessary to adjust the chromaticity of the LEDs 24 toward the blue color as much as before, and as a result, it is possible to prevent the brightness of the LEDs 24 from decreasing due to the chromaticity adjustment.

Furthermore, according to the research conducted by the inventor of the present invention, when using the liquid crystal panel 11 having four primary colors, the brightness of the red color in particular is lowered among the light emitted from the liquid crystal panel 11. The possible cause thereof is that, in the liquid crystal panel 11 having four primary colors, the number of subpixels constituting one pixel is increases from three to four, thus reducing the area of each subpixel compared to a liquid crystal panel having three primary colors, and as a result, the brightness of the red color in particular is lowered. To avoid this situation, in the present embodiment, the area of the red colored portions R in the color filters 19 is made larger than the area of the green colored portions G and the yellow colored portions Y, which makes it possible to include more red color in the transmitted light of the color filters 19. As a result, it is possible to suppress the brightness of the red light from lowering due to having four colors in the color filters 19.

(Description of Configuration of Main Part of the Present Embodiment)

Figure 9:
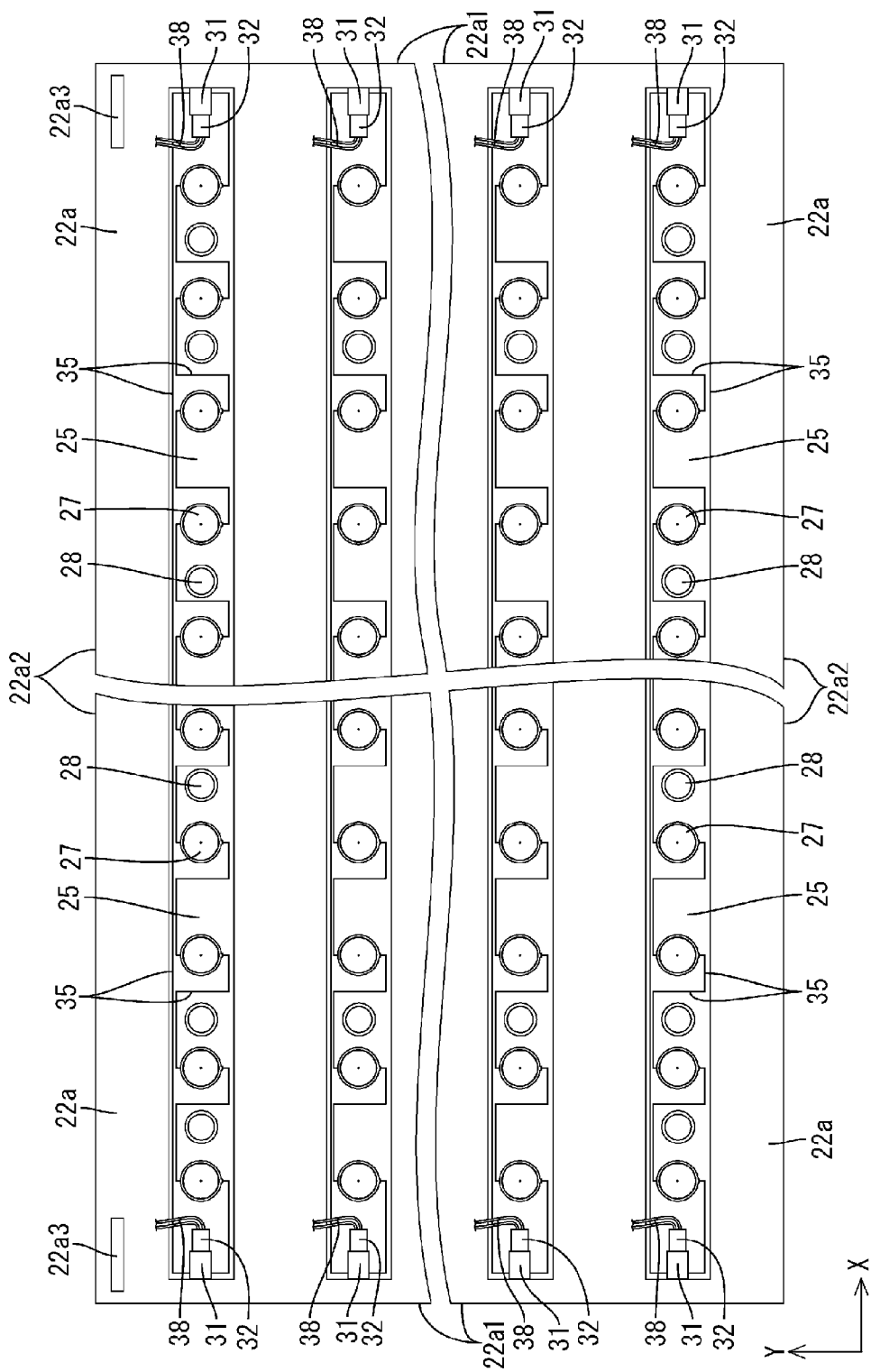
FIG. 9 is a plan view showing a bottom plate 22a of the chassis 22 and an arrangement of first connectors 31, second connectors 32, and the like in respective LED substrates 25.

Next, configurations and connecting structures of the wiring patterns 35 formed on the LED substrates 25 and the first connectors 31, and configurations and connecting structures of the second connectors 32 and the power supply wiring lines 38, which are main parts of the present embodiment, will be explained in detail. First, the configurations and connecting structures of the wiring patterns 35 formed on the LED substrates 25 and the first connectors 31 will be explained. As shown in FIG. 9, the wiring pattern 35 connects the respective LEDs 24 to each other in series by extending them on the LED substrate 25 in a zigzag manner. The first connectors 31 are each formed in a rectangular shape in a plan view, and are disposed such that the respective plane directions of side faces match the X axis direction and the Y axis direction, respectively. In each of the LED substrates 25, the first connector 31 is disposed on an end portion 25b that has, of two end faces on the short sides of the LED substrate 25 (two end faces along the longitudinal direction), one end face 25a of the LED substrate 25 that faces either of the two side plates 22b that rise from the first side edges 22a1 of the bottom plate 22a (outer side of the chassis 22) (see FIG. 10). The respective ends of the wiring pattern 35 are electrically connected to the first connector 31 on the end portion 25b.

Figure 10:
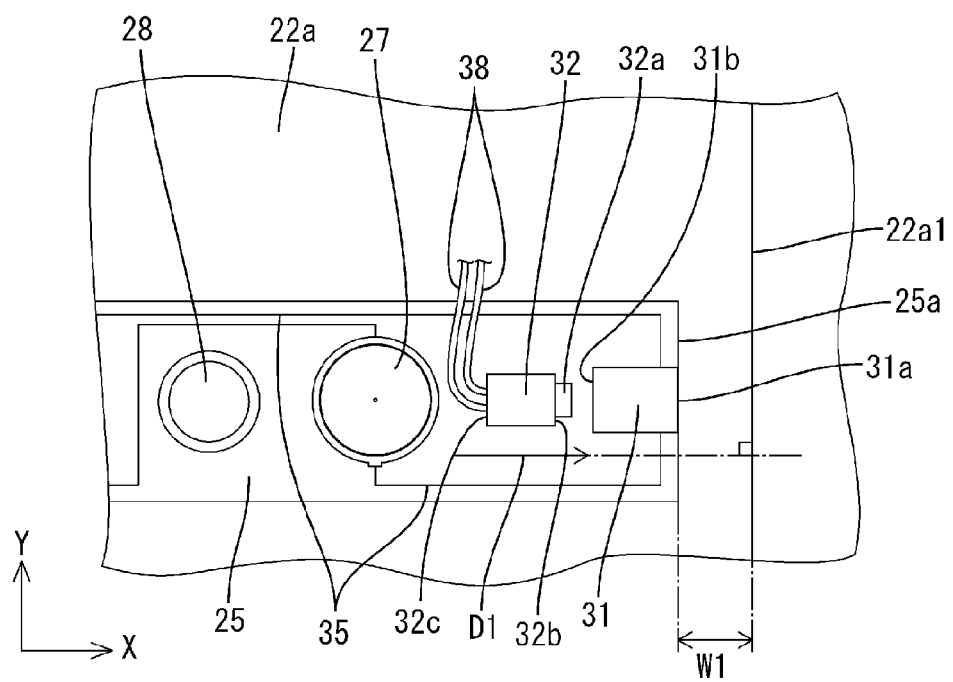
FIG. 10 is an enlarged plan view showing an end portion 25b having one end face 25a of the LED substrate 25, and a connecting direction of a second connector 32 that is connected to a first connector 31 on the end portion 25b.

Next, the configurations and the connecting structure of the second connectors 32 and the power supply wiring lines 38 will be explained. As shown in FIGS. 9 and 10, the second connectors 32 are each formed in a rectangular shape in a plan view, and are disposed such that the respective plane directions of side faces match the X axis direction and the Y axis direction, respectively, in a manner similar to the first connectors 31. As shown in FIG. 9, the respective second connectors 32 are connected to the first connectors 31 in the same direction as each other. Specifically, as shown in FIG. 10, each second connector 32 is electrically connected to a first connector 31 in a connecting direction D1 that is a direction (the direction in FIGS. 9 and 10 that goes from the left side to the right side) along the plane of the bottom plate 22a (direction along the plane of the LED substrate 25) and that is, in a plan view, a direction that is directed toward the first side edge 22a1 from the opposite side of the first side edge 22a1 across the first connector 31 at a right angle (parallel with the second side edges 22a2) with respect to the first side edge 22a1, which face the end face 25a. The second connector 32 has a connector plug 32a on a side face 32b that is connected to the first connector 31. The connector plug 32a protrudes toward the first connector 31 and can be plugged into the first connector 31. By the connector plug 32a being plugged into the first connector 31 along the above-mentioned connecting direction, the second connector 32 is connected and affixed to the first connector 31.

The power supply wiring lines 38 are electrically connected to the second connector 32, and as shown in FIG. 10, among the side faces of the second connector 32, extend from a side face 32c of the second connector 32 on the side opposite to the side face 32b that is connected to the first connector 31. In the chassis 22, the power supply wiring lines 38 that extend from the side faces 32c of the respective second connectors 32 are led out to respective wiring insertion openings 22a3 disposed near one of the second side edges 22a2 of the bottom plate 22a (see FIG. 9). The power supply wiring lines 38 led out to the wiring insertion openings 22a3 are inserted through the wiring insertion openings 22a3 and are led out to the rear side of the chassis 22, and on the rear side of the chassis 22, the power supply wiring lines 38 are electrically connected to connectors of the LED driver circuit. Therefore, when the first connectors 31 and the second connectors 32 are connected to each other, the power supply wiring lines 38 and the wiring patterns 35 are electrically connected to each other via the first connectors 31 and the second connectors 32, thereby allowing power to be supplied from the LED driver circuit to the respective LEDs 24. FIGS. 9 and 10 only show the vicinity of portions of the power supply wiring lines 38 connected to the second connectors 32, and other portions are not shown in the figures.

Figure 11:
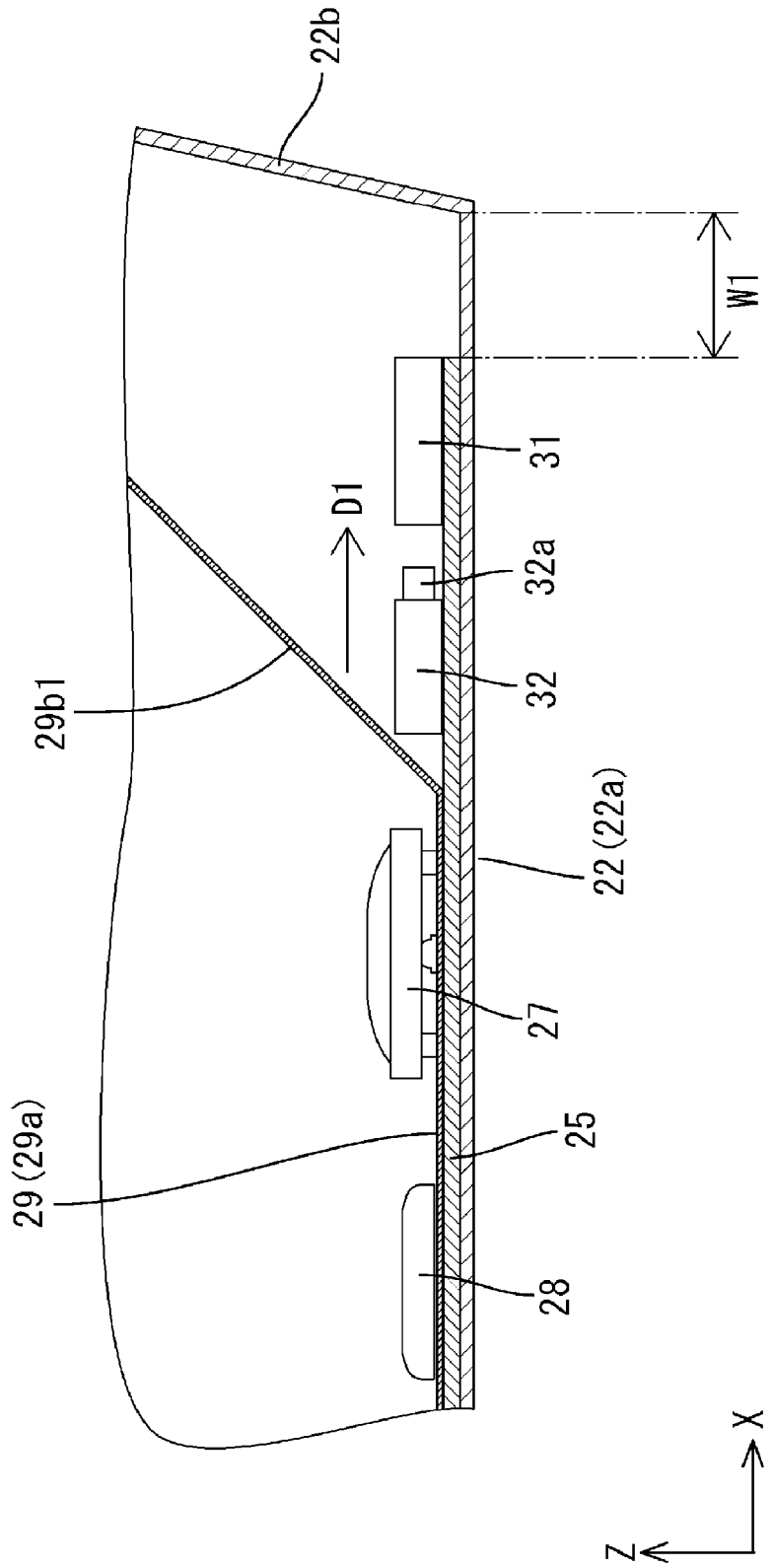
FIG. 11 is a cross-sectional view showing a positional relationship of the second connector with respect to the side plate that rises from the first side edge and the first inclined section of the reflective sheet.

As shown in FIG. 11, the second connectors 32 are connected to the first connectors 31 between the first inclined section 29b1 of the first reflective sheet 29 and the side plate 22b of the chassis 22. Therefore, in the backlight device 12 according to the present embodiment, light is emitted from the LEDs 24 and passes through the diffusion lens 27, and then is directed to the first inclined section 22b1 of the reflective sheet 29, and this light is not blocked by the first connectors 31 or the second connectors 32. The power supply wiring lines 38 connected to the second connectors 32 are not shown in FIG. 11.

As shown in FIG. 10, because the second connectors 32 are connected to the first connectors 31, respectively, in the connecting direction, each second connector 32 is disposed on the side face 31b opposite to the first side edges 22a1, out of side faces of the first connector 31, and is not disposed on the side face 31a that faces the side plate 22b on the short side of the chassis 22 (the side face 31a that faces the first side edge 22a1). As shown in FIGS. 10 and 11, in this configuration, because the second connector 32 is not disposed between the first side edge 22a1 and the one end face 25a of the LED substrate 25, it is possible to move the first side edge 22a1 closer to the one end face 25a of the LED substrate 25, which allows the distance W1 between the first side edge 22a1 and the one end face 25a of the LED substrate 25 to be smaller. Thus, in the backlight device 12, the distance W1 between each first side edge 22a1 of the bottom plate 22a (each side plate 22b on the short side of the chassis 22) and the one end faces 25a of the respective LED substrates 25 is made smaller compared to the configuration in which each second connector 32 is disposed on the side face 31a that faces the first side edge 22a1, out of the side faces of the first connector 31 (see FIG. 10). This allows the frame region of the backlight device 12 to be narrower.

Because the second connectors 32 are connected to the first connectors 31, respectively, with the direction D1 being the connecting direction, the power supply wiring lines 38 connected to the respective second connectors 32 are less likely to be disposed between the first side edges (side plates 22b on the short sides of the chassis 22) 22a1 of the bottom plate 22a and the one end faces 25a of the respective LED substrates 25. Therefore, it is possible to reduce the distance W1 between each first side edge (each side plate 22b on the short side of the chassis 22) 22a1 of the bottom plate 22a and the one end faces 25a of the LED substrates 25.

In the backlight device 12 according to the present embodiment as described above, the second connectors 32 are connected to the first connectors 31 from the side that is opposite to the first side edge 22a1 facing the one end face 25a. Therefore, it can be made so that the second connectors 32 do not need to be disposed between the side plate 22b of the chassis 22 and the one end faces 25a of the LED substrates 25. Thus, the second connectors 32 do not make it difficult for the side plates 22b of the chassis 22 to be made closer to the one end faces 25a of the respective LED substrates 25 (inner side of the chassis 22). Therefore, it is possible to relatively narrow the distance between the side plates 22b of the chassis 22 and the one end faces 25a of the LED substrates 25, more than it is possible if the connection direction is the direction toward the one side face 25a from the first side edge 22a1 at a right angle with respect to the first side edge 22a1 where the side plate 22b facing the one side faces 25a of the LED substrate 25 is disposed. This allows the frame region of the backlight device 12 to be narrower.

In the backlight device 12 according to the present embodiment, the bottom plate 22a of the chassis 22 is formed in a horizontally long rectangular shape, and the side edges 22a1 and 22a2 include a pair of first side edges 22a1 along the short side direction (Y axis direction) of the bottom plate 22a and a pair of second side edges 22a2 along the long side direction (X axis direction) of the bottom plate 22a. A plurality of LED substrates 25 are disposed on the bottom plate 22a, and respective end faces 25a face the side plates 22b that rise from the first side edges 22a1, respectively. Furthermore, the first connectors 31 are disposed on the plurality of LED substrates 25, respectively, and the second connectors 32 are connected to the plurality of first connectors 31. Therefore, in the backlight device 12 in which a plurality of LED substrates 25 are disposed on the bottom plate 22a, the distance between the side plates 22b that rise from the first side edges 22a1 and the respective end faces 25a of the LED substrates 25 can be made smaller, thereby making it possible to achieve a narrower frame region in the backlight device 12.

In the backlight device 12 of the present embodiment, the respective plurality of second connectors 32 are connected to the first connectors 31 in the same connecting direction as each other. Therefore, in the manufacturing process of the backlight device 12, when connecting the first connectors 31 and the second connectors 32 to each other, the connecting work can be conducted in the same direction for all of the connectors.

In the backlight device 12 according to the present embodiment, the power supply wiring lines 38 are connected to the second connectors 32 from the direction that is along the plane of the bottom plate 22a and that is parallel to the second side edges 22a2 in a plan view. Therefore, a configuration is possible in which the power supply wiring lines 38 are less likely to be disposed on the LED 24 side (the diffusion lens 27 side) than if the power supply wiring lines 38 are connected to the second connectors 32 with the connection direction being the direction directed toward the one end faces 25a from a side opposite to the first side edge 22a1 across the first connectors 31 at a right angle with respect to the first side edge 22a1 in a plan view. Therefore, when the power supply wiring lines 38 are disposed in the chassis 22, it is possible to prevent or suppress the power supply wiring lines 38 from being disposed on the side to which light is emitted of the LEDs 24 (the diffusion lens 27).

In the backlight device 12 according to the present embodiment, the plurality of LED substrates 25 form respective horizontally long quadrangular shapes, and the plurality of LED substrates 25 are disposed on the bottom plate 22a in rows and columns such that both end faces of the short sides thereof go along the first side edges 22a1, and such that both end faces of the long side thereof go along the second side edges 22a2. One of the end faces of the short side is designated as the one end face 25a. As a result, the frame region of the backlight device 12 can be narrowed, while realizing a backlight device 12 in which a plurality of LED substrates 25 are arranged in rows and columns inside the chassis 22.

The backlight device 12 of the present embodiment further includes the diffusion lenses 27 that are respectively disposed on the respective plurality of LED substrates 25 to cover the side to which light is emitted of the LEDs 24 and to diffuse light from the LEDs 24. Thus, as a result of the light from the LEDs 24 passing through the diffusion lenses 27, the light from the LEDs 24 is diffused and the directivity thereof is lessened, and therefore, even when the number of LEDs 24 is reduced, it is possible to maintain a prescribed brightness in the backlight device 12.

The backlight device 12 of the present embodiment further includes the reflective sheet 29 that has the bottom section 29a laid over the LED substrates 25, the lens insertion holes 29d disposed in the bottom section 29a for having the diffusion lenses 27 inserted therethrough, and the respective inclined sections 29b1 and 29b2 that rise toward the light-exiting opening 22d (front side) of the chassis 22 near the side plates 22b of the chassis 22. Among the plurality of second connectors 32, second connectors 32 that are closest to the respective second side edges 22a2 are disposed between the reflective sheet 29 and the side plates 22b that rise from the respective first side edges 22a1. This way, the light emitted from the LEDs 24 and travelling toward the inclined sections 29b1 and 29b2 of the reflective sheet 29 is not blocked by the first connectors 31 or the second connectors 32, thereby increasing the utilization efficiency of light that was emitted from the LEDs 24.

Embodiment 2

Embodiment 2 will be described with reference to the drawings. Embodiment 2 differs from Embodiment 1 in the connecting direction of power supply wiring lines 138 with respect to second connectors 132. Other configurations are similar to those of Embodiment 1, and therefore, descriptions of the configurations, the operation, and the effect will be omitted. Parts in FIG. 12 that have 100 added to the reference characters of FIG. 10 are the same as these parts described in Embodiment 1.

Figure 12:
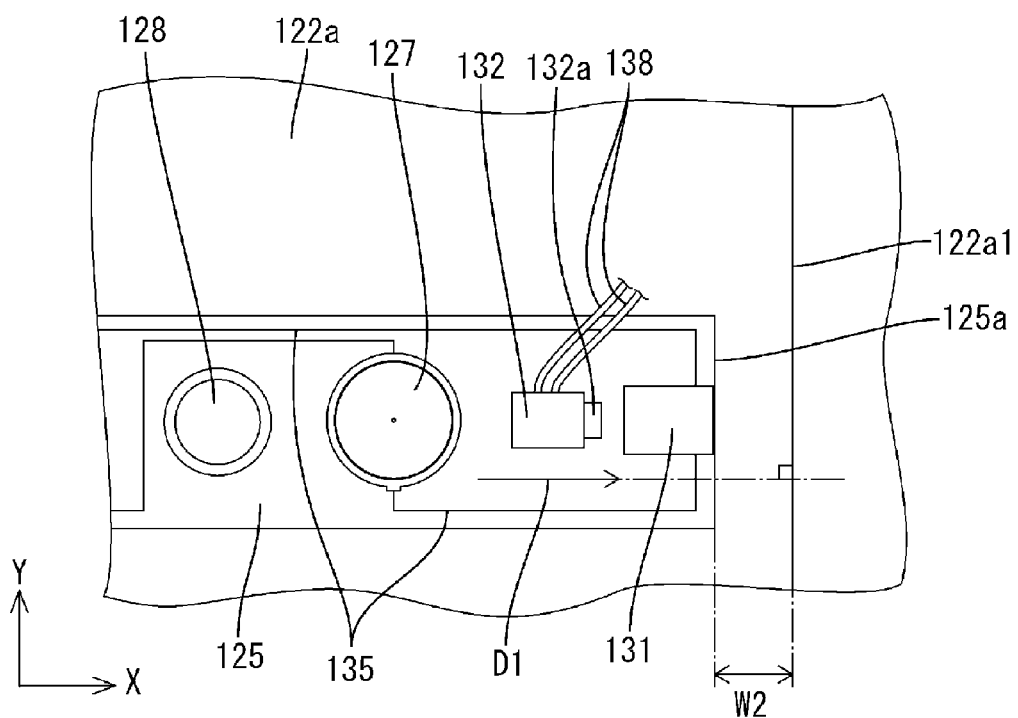
FIG. 12 is an enlarged plan view showing an end portion 125b having one end face 125a of the LED substrate 125, and a connecting direction of a second connector 132 that is connected to a first connector 131 on the end portion 125b in Embodiment 2.

As shown in FIG. 12, in a backlight device according to Embodiment 2, the power supply wiring lines 138 are connected to side faces that face a second side edge 122a2, among the side faces of second connectors 132, and the power supply wiring lines 138 extend in parallel with the first side edges 122a1. In other words, the power supply wiring lines 138 are connected to the second connectors 132 with the connection direction being a direction parallel to the first side edges 122a1. Thus, a configuration is possible in which the power supply wiring lines 138 are less likely to be disposed on an LED side (a lens diffusion 127 side) than if the power supply wiring lines 138 are connected to the second connectors 132 with the connecting direction being the direction directed toward the one end face 125a of LED substrate 125 from a side opposite to the first side edge 122a1 across the first connectors 131 at a right angle with respect to the first side edge 122a1 (the configuration in Embodiment 1). As a result, when the power supply wiring lines 138 are disposed in the chassis, it is possible to prevent or suppress the power supply wiring lines 138 from being disposed on a side of the diffusion lens 127 to which light is emitted from the LEDs (the side to which light is emitted of a the diffusion lens 127).

Embodiment 3

Embodiment 3 will be described with reference to the drawings. Embodiment 3 differs from Embodiment 1 in the connecting direction in which second connectors 232 are connected to first connectors 231. Other configurations are similar to those of Embodiment 1, and therefore, descriptions of the configurations, the operation, and the effect will be omitted. Parts in FIG. 13 that have 200 added to the reference characters of FIG. 9 are the same as these parts described in Embodiment 1.

Figure 13:
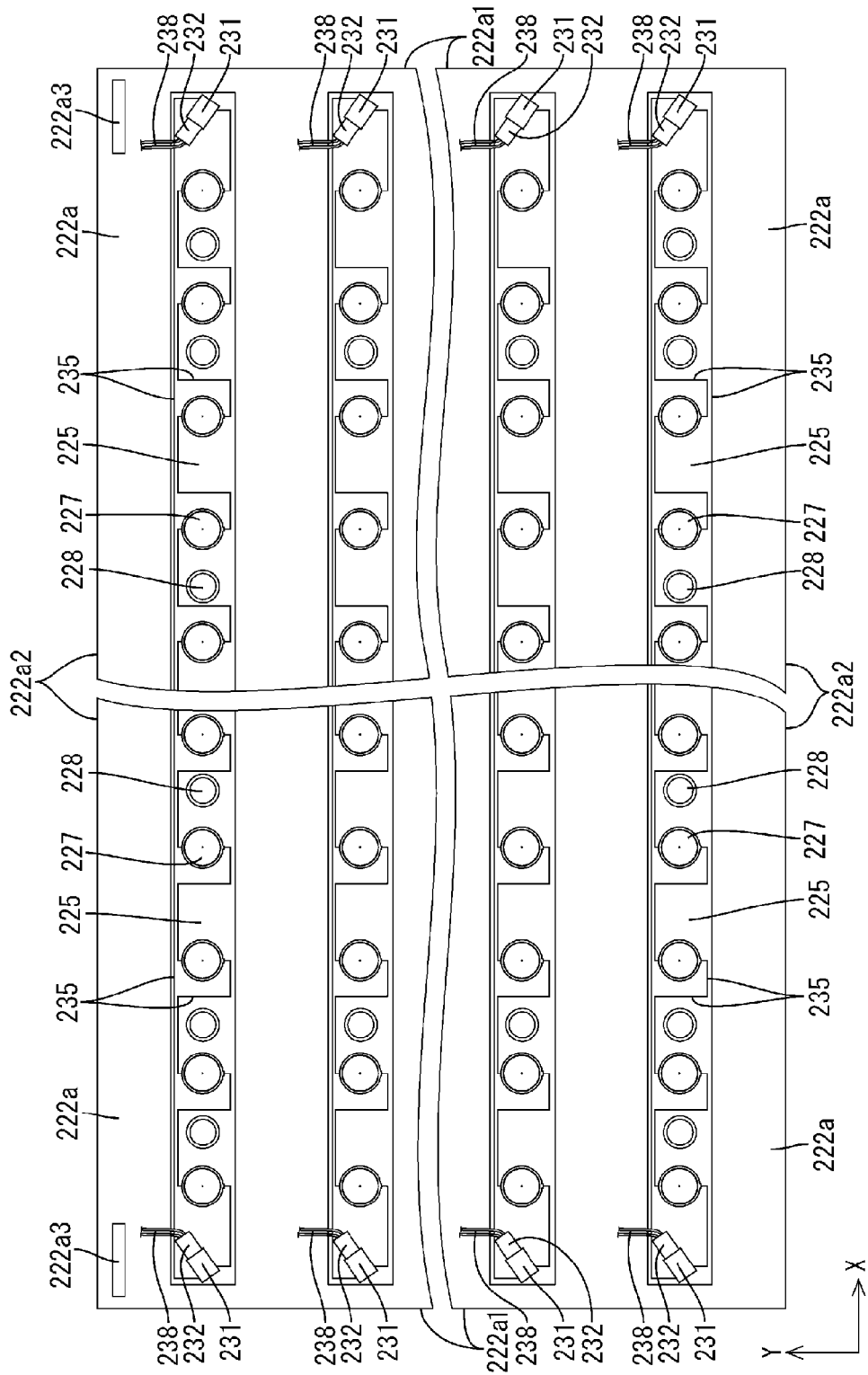
FIG. 13 is a plan view showing a bottom plate 222a of a chassis 222 and an arrangement of first connectors 231, second connectors 232, and the like in respective LED substrates 225 in Embodiment 3.
Figure 14:
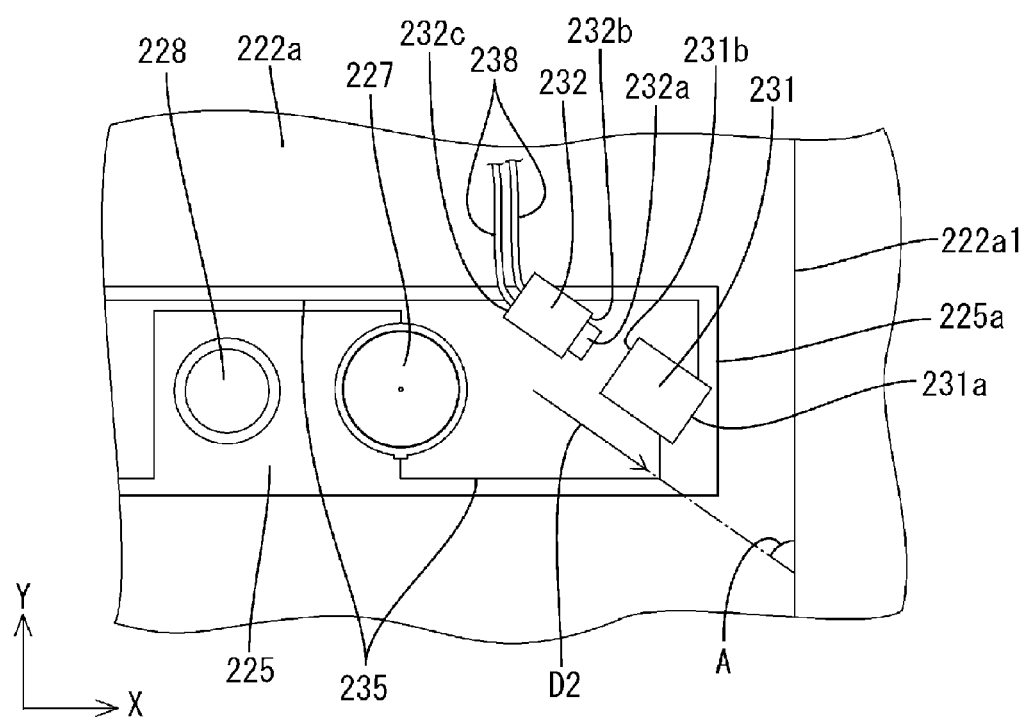
FIG. 14 is an enlarged plan view showing an end portion 225b having one end face 225a of the LED substrate 225, and a connecting direction of a second connector 232 that is connected to a first connector 231 on the end portion 225b.

As shown in FIGS. 13 and 14, in the backlight device of Embodiment 3, the first connectors 231 are disposed such that the directions of the planes of side faces of each first connector 231 having a rectangular shape in a plan view do not match the X axis direction or the Y axis direction. Specifically, in a plan view, the first connectors 231 are disposed such that a side face 231b of each first connector 231 to which the second connector 232 is connected is oriented diagonally. Each second connector 232 is connected to a first connector 231 in a connecting direction D2 that is a direction along the plane of a bottom plate 222a (a direction along the plane of the LED substrate 225) and that is, in a plan view, a direction directed toward the first side edge 222a1 from the opposite side of the first side edge 222a1 across the first connector 231 at an acute angle with respect to the first side edge 222a1, which face the one end face 225a of the LED substrates 225. The acute angle A is set to 45° in the present embodiment.

In the backlight device according to Embodiment 3, the second connectors 232 are connected to the first connectors 231 in the connecting direction, and as shown in FIG. 14, the second connectors 232 are disposed on the side face 231b opposite to the first side edges 222a1, out of side faces of the first connectors 231, and is not disposed on the side face 231a that faces the side plate on the short side of the chassis 222 (facing the first side edge 222a1). In such a configuration, as shown in FIGS. 13 and 14 the second connectors 232 are not disposed between the first side edges 222a1 and the one end faces 225a of the LED substrates 225, resulting in the first side edges 222a1 being able to be closer to the one end faces 225a of the LED substrates 225, and the distance between the first side edges 222a1 and the one end faces 225a of the LED substrates 225 being able to be made smaller. Thus, in the backlight device of the present embodiment, a distance between the first side edge 222a1 of the bottom plate 222a (the side plate 222b of the short side of the chassis 22) and the one end face 225a of the LED substrate 225 is made narrower (see FIG. 14) than the configuration in which the second connector 232 is disposed on the side face 231a facing the first side edge 222a1, among the side faces of the first connector 231. As a result, in the backlight device of the present embodiment, the frame region is made narrower.

If the above-mentioned acute angle A were smaller than 30° or greater than 60°, it would become difficult to connect the second connectors 232 to the first connectors 231. In the backlight device of the present embodiment, the abovementioned acute angle A is 45°, and the range thereof is set to 30° to 60°, and therefore, it is easy to connect the second connectors 232 to the first connectors 231.

Also, in the backlight device of Embodiment 3, the respective plurality of second connectors 232 are connected to the first connectors 231 in the same direction. Therefore, when connecting the first connectors 231 to the second connectors 232 in the manufacturing process of the backlight device, the connecting work can be conducted in the same direction for all of the connectors.

Embodiment 4

Embodiment 4 will be described with reference to the drawings. Embodiment 4 differs from Embodiment 3 in the connecting direction in which second connectors 332 are connected to first connectors 331. Other configurations are similar to those of Embodiment 3, and therefore, descriptions of the configurations, the operation, and the effect will be omitted. Parts in FIG. 15 that have 100 added to the reference characters of FIG. 13 are the same as these parts described in Embodiment 3.

Figure 15:
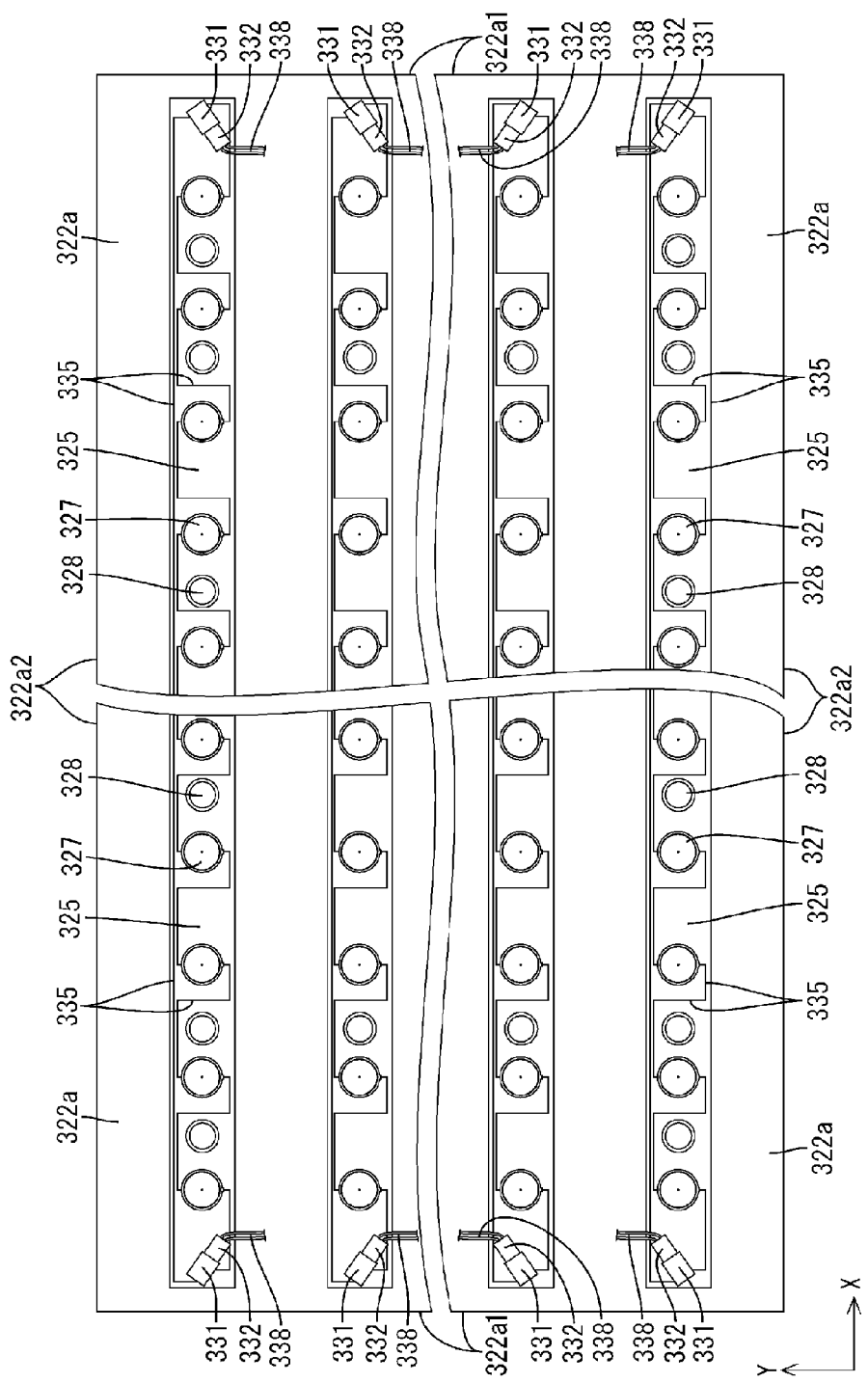
FIG. 15 is a plan view showing a bottom plate 322a of a chassis 322 and an arrangement of first connectors 331, second connectors 332, and the like in respective LED substrates 325 in Embodiment 4.

As shown in FIG. 15, in the backlight device according to Embodiment 4, the connecting direction in a plan view of each second connector 332 that connects to each first connector 331 forms an acute angle with respect to first side edges 322a1 facing one end faces 325a of LED substrates 325, and the connecting direction is a direction directed toward the first side edges 322a1 from the opposite side of the first side edges 322a1 across the first connectors 331, the direction also being directed toward second side edges 322a2 from the center of the short side direction of a bottom plate 322a. Wiring insertion openings are disposed near the center portion of the bottom plate 322a (and therefore, FIG. 15 does not show the wiring insertion openings).

In the backlight device according to Embodiment 4, each of the second connectors 332 is connected to each of the first connectors 331 with the abovementioned direction as the connecting direction, and thus each power supply wiring line 338 connected to the respective second connector 332 extends toward the center of the short side direction of the bottom plate 322a. This makes it possible to draw the power supply wiring lines 338 toward the center of the bottom plate 222a with ease, thereby allowing the power supply wiring lines 338 to be inserted through the wiring insertion openings formed near the center portion of the bottom plate 322a.

In the backlight device according to Embodiment 4, the second connectors 332 are connected to the first connectors 331 in the connecting direction described above, and thus among the side faces of the first connectors 331, the second connectors 332 are disposed on the side face that is oriented toward the center of the short side direction of the bottom plate 322. This way, the respective second connectors 332 positioned closest to the pair of second side edges 322a2 are not disposed between the respective LED substrates 325 positioned closest to the pair of second side edges 322a2 and the side plates that rise from the respective second side edges 322a2. This makes it possible to respectively move the pair of second side edges 322a2 closer to the LED substrates 325 (inner side; toward the center of the bottom plate 322a in the short side direction), and therefore, the distance between the LED substrates 325 and the side plates that rise from the second side edges 322a2 can be reduced. As a result, it is possible to achieve an even narrower frame region in the backlight device.

Embodiment 5

Embodiment 5 will be described with reference to the drawings. Embodiment 5 differs from Embodiment 1 in the configuration of the connecting members. Other configurations are similar to those of Embodiment 1, and therefore, descriptions of the configurations, the operation, and the effect will be omitted. Parts in FIG. 16 that have 400 added to the reference characters of FIG. 10 are the same as these parts described in Embodiment 1.

Figure 16:
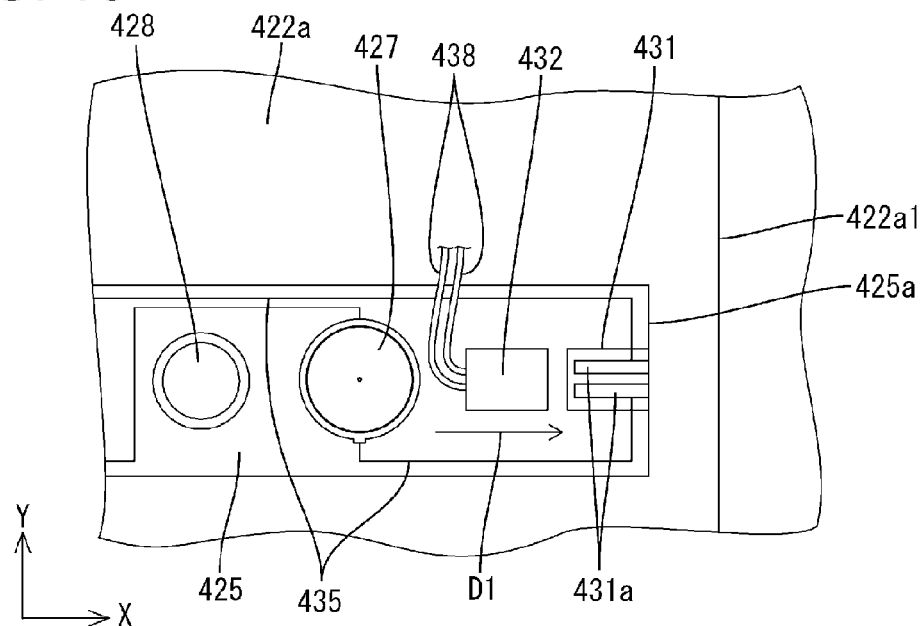
FIG. 16 is an enlarged plan view showing an end portion 425b having one end face 425a of an LED substrate 425, and a connecting direction of a card connector 432 that is connected to a terminal 431 on the end portion 425b in Embodiment 5.

As shown in FIG. 16, a backlight device according to Embodiment 5 has a terminal (an example of a first connecting member) 431 that is rectangular in a plan view and provided on an end portion 425b. Of both end portions in the long direction of an LED substrate 425, the end portion 425b has a one end face 425a facing a first side edge 422a1 of a bottom plate 422a of a chassis. On the terminal 431, exposed electrode terminals 431a are disposed, and respective ends of a wiring pattern 435 formed on the LED substrate 425 are electrically connected to the electrode terminals 431a.

To the terminal 431, a card-type card connector (one example of a second connecting member) 432 in a rectangular shape in a plan view as shown in FIG. 16 is connected. In the present embodiment, the second connector 432 is electrically connected to the terminal 431 in the same connecting direction as the connecting direction D1 between the first connector 31 and the second connector 32 in Embodiment 1. Power supply wiring lines 438 are electrically connected to the second connector 432, and extend from the side face of the card connector 432 on the side opposite to the side face to be connected to the terminal 431.

On both edges of the card connector 432, not-shown guide grooves are formed. The guide grooves can engage respective edges of the terminal 431, which makes it possible to slide the card connector 432 with the guide grooves and the terminal 431 engaging each other. The card connector 432 has a not-shown metal terminal therein. By making the guide grooves of the card connector 432 engage the respective edges of the terminal 431, and by sliding the card connector 432 in the direction D1 along the guide grooves, the metal terminal in the card connector 432 makes contact with the electrode terminals, thereby electrically connecting the terminal 431 to the card connector 432. Also, by sliding the card connector 432 in the direction D1 along the guide grooves, the card connector 432 is positioned on the surface of the terminal 431 (both are disposed in the same position in a plan view), and the card connector 432 is affixed to the terminal 431. Even with this configuration, the distance between the first side edge 422a1 of the bottom plate 422a and the one end face 425a of the LED substrate 425 can be reduced as compared with the case in which the card connector 432 is placed on the side of the one end face 425a that faces the first side edge 422a1, and thus, it is possible to achieve a narrower frame region in the backlight device.

Embodiment 6

Embodiment 6 will be described with reference to the drawings. Embodiment 6 differs from Embodiment 5 in the connecting direction of the connecting members. Other configurations are similar to those of Embodiment 5, and therefore, descriptions of the configurations, the operation, and the effect will be omitted. Parts in FIG. 17 that have 100 added to the reference characters of FIG. 16 are the same as these parts described in Embodiments 1 and 5.

Figure 17:
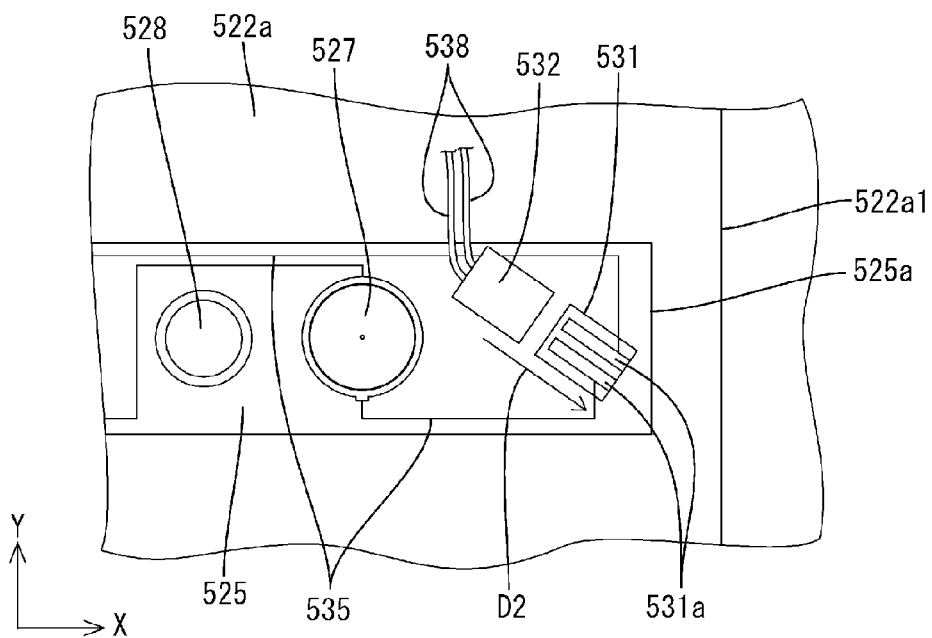
FIG. 17 is an enlarged plan view showing an end portion 525b having one end face 525a of an LED substrate 525, and a connecting direction of a card connector 532 that is connected to a terminal 531 on the end portion 525b in Embodiment 6.

As shown in FIG. 17, in the backlight device of Embodiment 6, a terminal 531 in a rectangular shape in a plan view extends from one end portion 525b of an LED substrate 525 in a manner similar to Embodiment 5. Also, in a manner similar to Embodiment 5, electrode terminals 531a are disposed on the terminal 531, and a card connector 532 in a rectangular shape in a plan view is connected to the terminal 531. Furthermore, in a manner similar to Embodiment 5, not-shown guide grooves are formed at respective edges of the card connector 532, and a not-shown metal terminal is disposed inside the card connector 532. In the present embodiment, the card connector 532 is connected to the terminal 531 in the same connecting direction as the connecting direction D2 between the first connector 231 and the second connector 232 in Embodiment 3. That is, by sliding the card connector 532 in the direction D2 along the guide grooves, the card connector 532 is positioned on the surface of the terminal 531 (both are disposed in the same position in a plan view), and the card connector 532 is affixed to the terminal 531. Even with this configuration, the distance between the first side edge 522a1 of the bottom plate 522a and the one end face 525a of the LED substrate 525 can be reduced as compared with the case in which the card connector 532 is placed on the side of the one end face 525a that faces the first side edge 522a1, and thus, it is possible to achieve a narrower frame region in the backlight device.

Modification examples of the respective embodiments above will be described below.

(1) In the respective embodiments above, the configuration in which the first connectors and the second connectors are rectangular in a plan view was described as an example, but the shape, configuration, and the like of the first connectors and the second connectors are not limited. For example, it is possible to employ a configuration in which the respective connectors are formed in a flat shape, and by sliding one connector toward the other along the plane, the respective connectors are connected to each other.

(2) In the respective embodiments above, the configuration in which one end faces of LED substrates face side plates that rise from first side edges of the chassis was described as an example, but it is also possible to employ a configuration in which one end faces of LED substrates face side plates that rise from second side edges of the chassis. In the respective embodiments above, the configuration in which the LED substrate is a horizontally long rectangle with the short side matching the first side edge and the long side matching the second side edge was described as an example, but there is no special limitation on the shape, arrangement, quantity, and the like of the LED substrates.

(3) In the respective embodiments above, the configuration in which LEDs are disposed in a row along the long side direction (X axis direction) of the chassis on each LED substrate was described as an example, but there is no special limitation on the shape, arrangement, quantity, and the like of the LEDs. For example, the LEDs may be arranged in a row along the short side direction (Y axis direction) of the chassis.

(4) In the respective embodiments above, the configuration in which one end face of an LED substrate is a flat surface was described as an example, but the one end face of the LED substrate may also be formed as a rounded curved face. In the respective embodiments above, the configuration in which one end face of an LED substrate is parallel to the first side edge (side plate that rises from that side edge) of the chassis was described as an example, but the one end face does not have to be parallel thereto.

(5) In addition to the respective embodiments above, the connecting direction in which the second connectors are connected to the respective first connectors may be appropriately changed.

(6) In addition to the respective embodiments above, the arrangement, shape, and the like of the wiring insertion openings may be appropriately changed.

Figure 18:
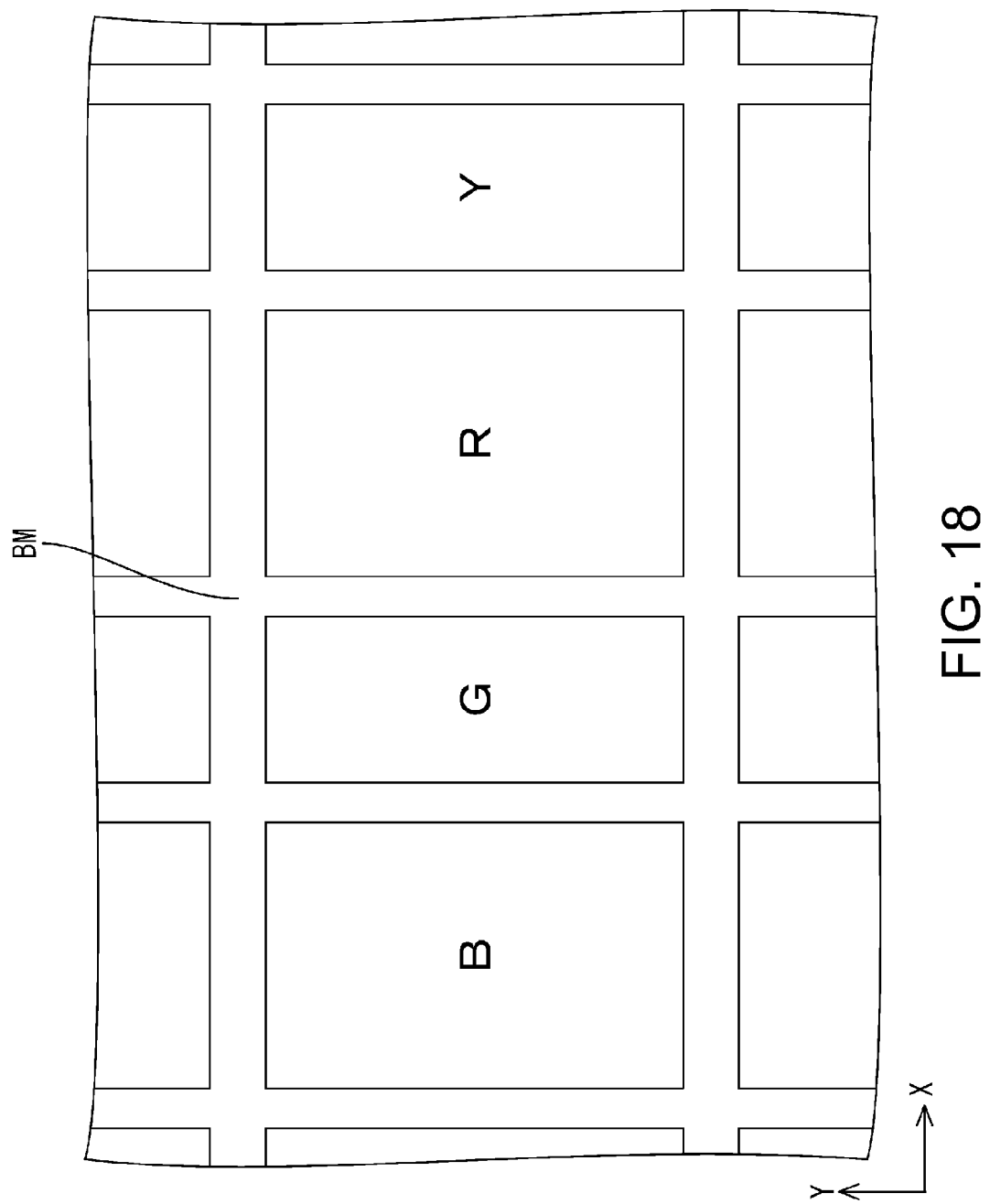
FIG. 18 is an enlarged plan view of a CF substrate according to Modification Example 1.

(7) In addition to the respective embodiments above, the arrangement order of the respective colored portions R, G, B, and Y in the color filters may be appropriately changed. As shown in FIG. 18, for example, the blue colored portion B, the green colored portion G, the red colored portion R, and the yellow colored portion Y may be arranged in this order from the left side of the figure along the X axis direction.

Figure 19:
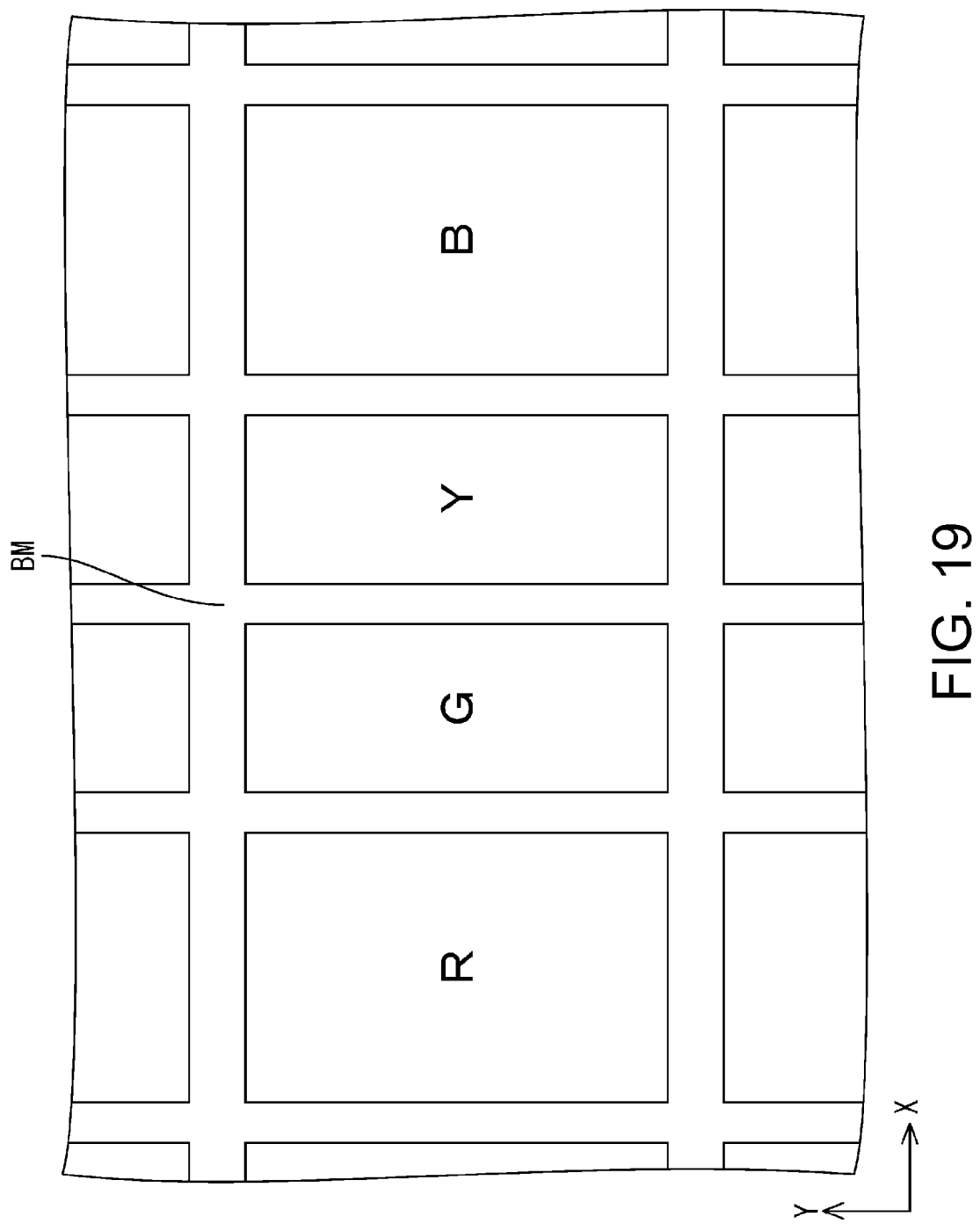
FIG. 19 is an enlarged plan view of a CF substrate according to Modification Example 2.

(8) In addition to the configuration of (7), as shown in FIG. 19, for example, the respective colored portions R, G, B, and Y in the color filters may be arranged in order of the red colored portion R, the green colored portion G, the yellow colored portion Y, and the blue colored portion B from the left side of the figure along the X axis direction.

Figure 20:
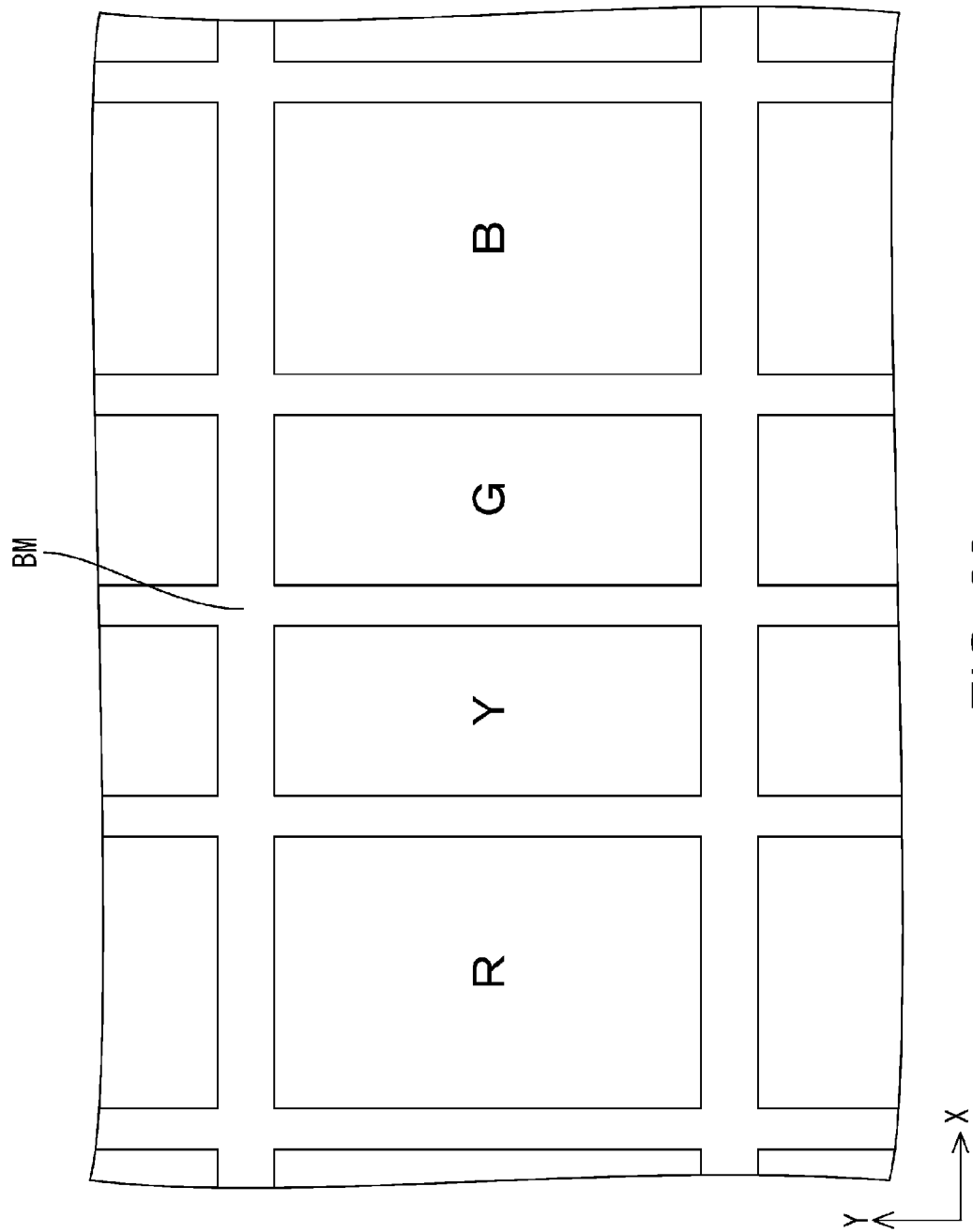
FIG. 20 is an enlarged plan view of a CF substrate according to Modification Example 3.

(9) In addition to the configurations of (7) and (8), as shown in FIG. 20, for example, the respective colored portions R, G, B, and Y in the color filters may be arranged in order of the red colored portion R, the yellow colored portion Y, the green colored portion G, and the blue colored portion B from the left side of the figure along the X axis direction.

Figure 21:
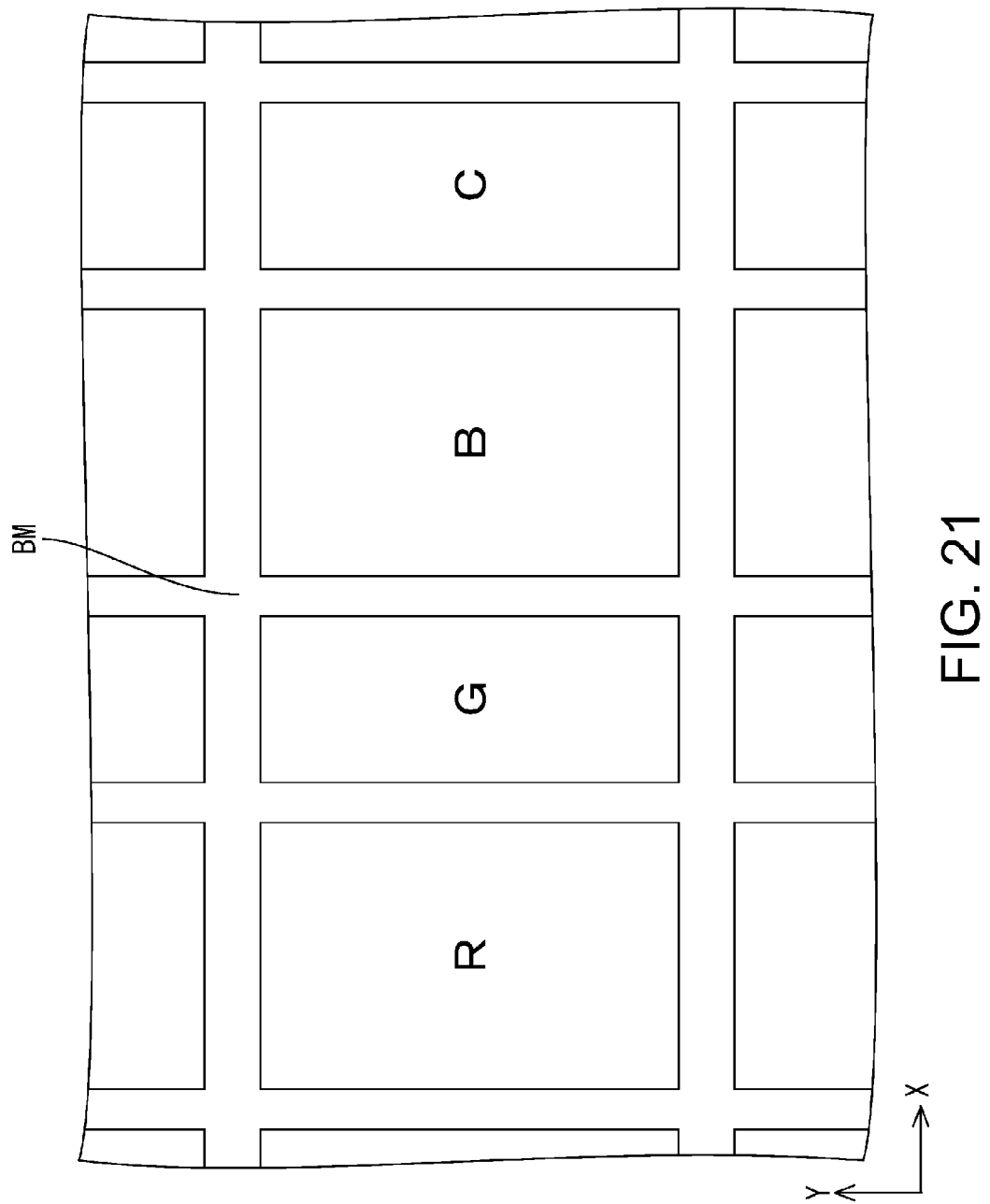
FIG. 21 is an enlarged plan view of a CF substrate according to Modification Example 4.

(10) In the respective embodiments above, the colored portions of the color filters were configured to have yellow (Y), in addition to red (R), green (G), blue (B), which are the three primary colors of light, but as shown in FIG. 21, it is also possible to add cyan colored portions C, instead of the yellow colored portions.

Figure 22:
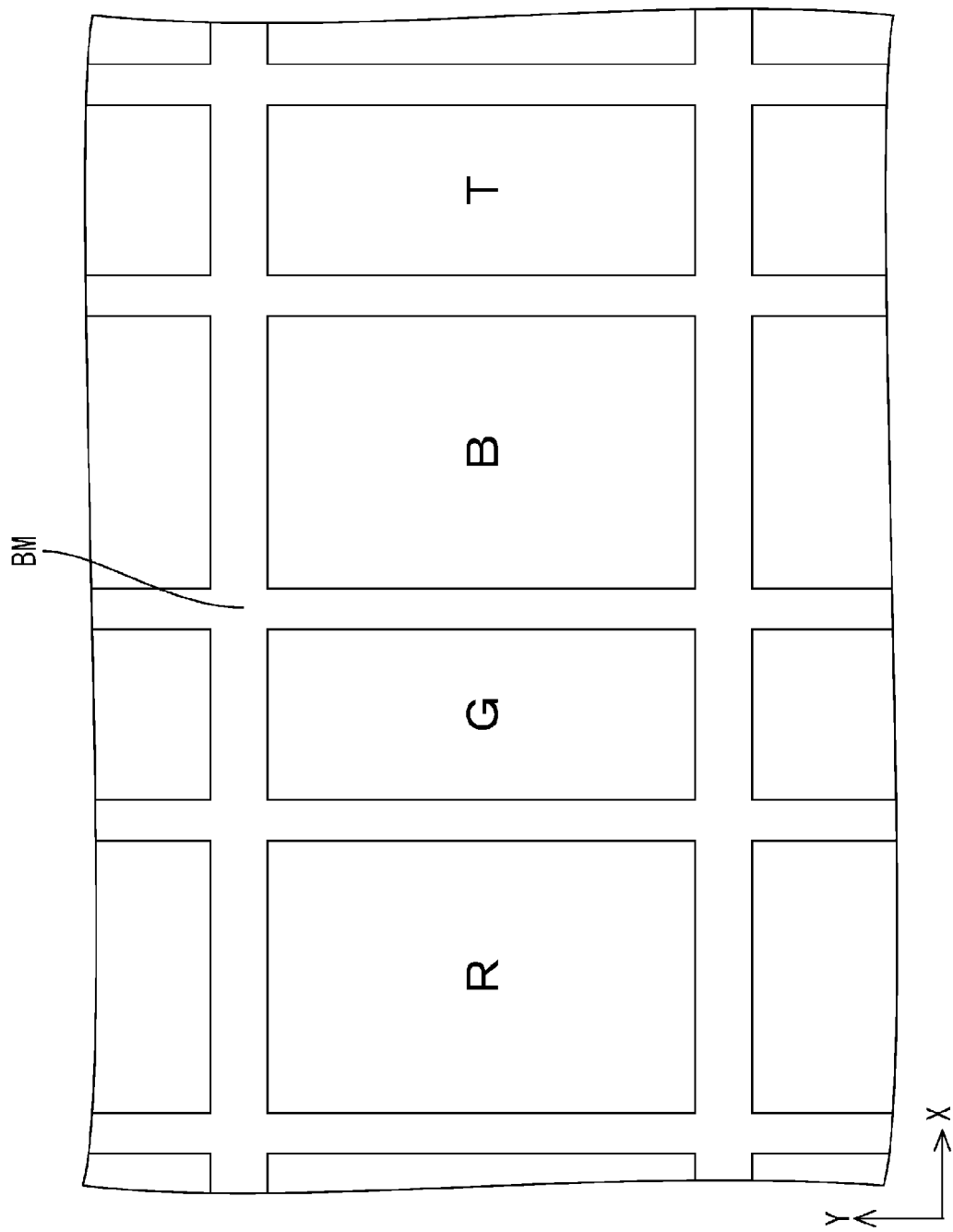
FIG. 22 is an enlarged plan view of a CF substrate according to Modification Example 5.

(11) In the respective embodiments above, the colored portions of the color filters had four colors, but as shown in FIG. 22, it is also possible to dispose transmissive portions T that do not color the transmitted light in place of the yellow colored portions. The transmissive portions T transmit all wavelengths of at least visible light in a substantially equal manner, and thus do not color the transmitted light to a specific color.

Figure 23:
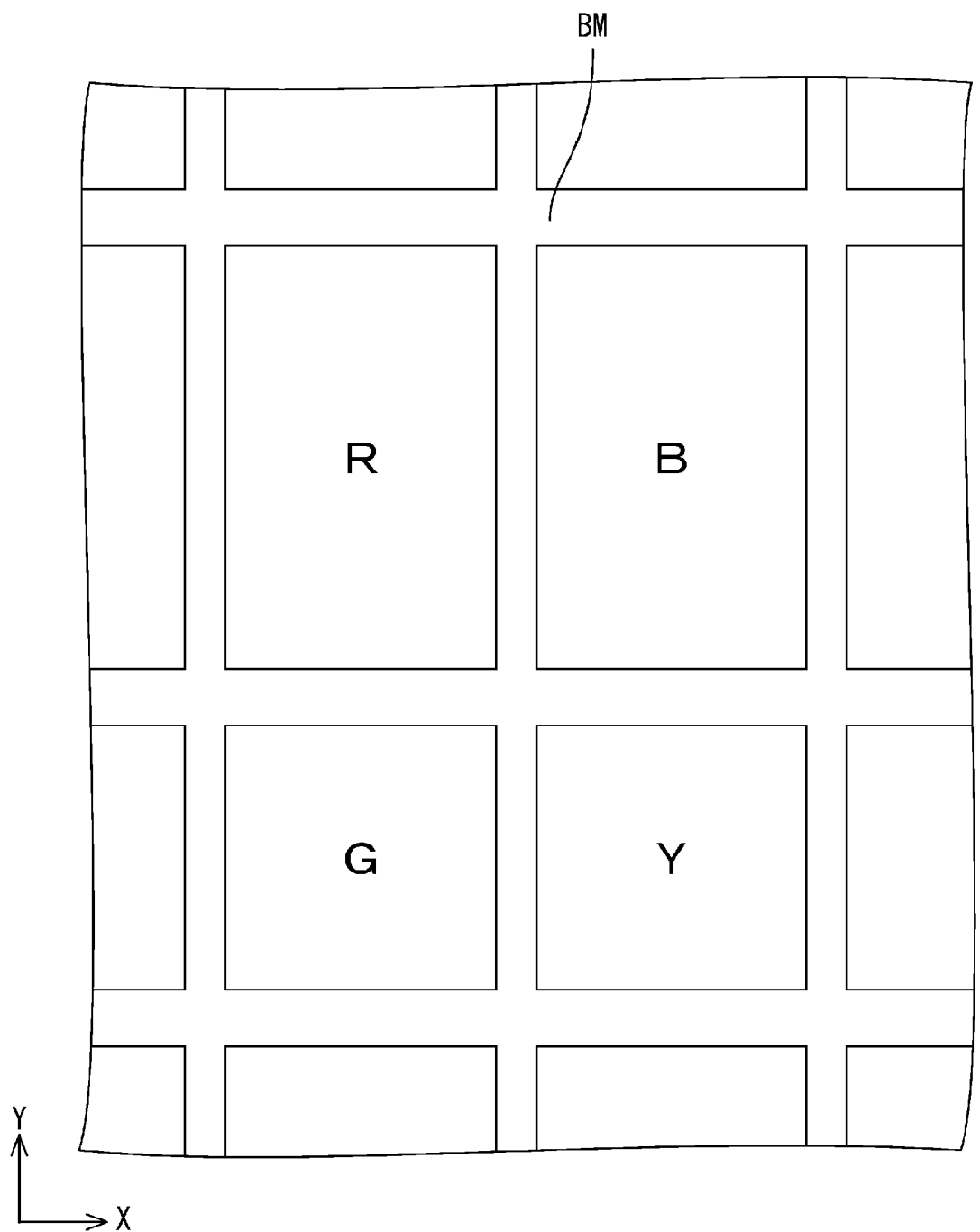
FIG. 23 is an enlarged plan view of a CF substrate according to Modification Example 6.

(12) In the respective embodiments above, the configuration in which the colored portions of four colors R, G, B, and Y that constitute the color filters are arranged along the row direction was described as an example, but it is also possible to arrange the colored portions of four colors R, G, B, and Y in the row and column directions. Specifically, as shown in FIG. 23, the colored portions of four colors R, G, B, and Y are arranged in rows and columns with the X direction being the row direction and the Y direction being the column direction, and while the dimension of the respective colored portions R, G, B, and Y in the row direction (X axis direction) is the same, the colored portions R, G, B, and Y that are disposed in adjacent rows have different dimensions in the column direction (Y axis direction) from each other. In the row with the relatively large column direction dimension, the red colored portion R and the blue colored portion B are disposed adjacent to each other along the row direction, and in the row with the relatively small column direction dimension, the green colored portion G and the yellow colored portion Y are disposed adjacent to each other along the row direction. That is, first rows with the relatively large column direction dimension in which the red colored portions R and the blue colored portions B are alternately arranged in the row direction and second rows with the relatively small column direction dimension in which the green colored portions G and the yellow colored portions Y are alternately arranged in the row direction alternate with each other in the column direction. Accordingly, the area of the red colored portion R and the blue colored portion B is larger than the area of the green colored portion G and the yellow colored portion Y. The green colored portion G is disposed adjacent to the red colored portion R in the column direction, and the yellow colored portion Y is disposed adjacent to the blue colored portion B in the column direction.

Figure 24:
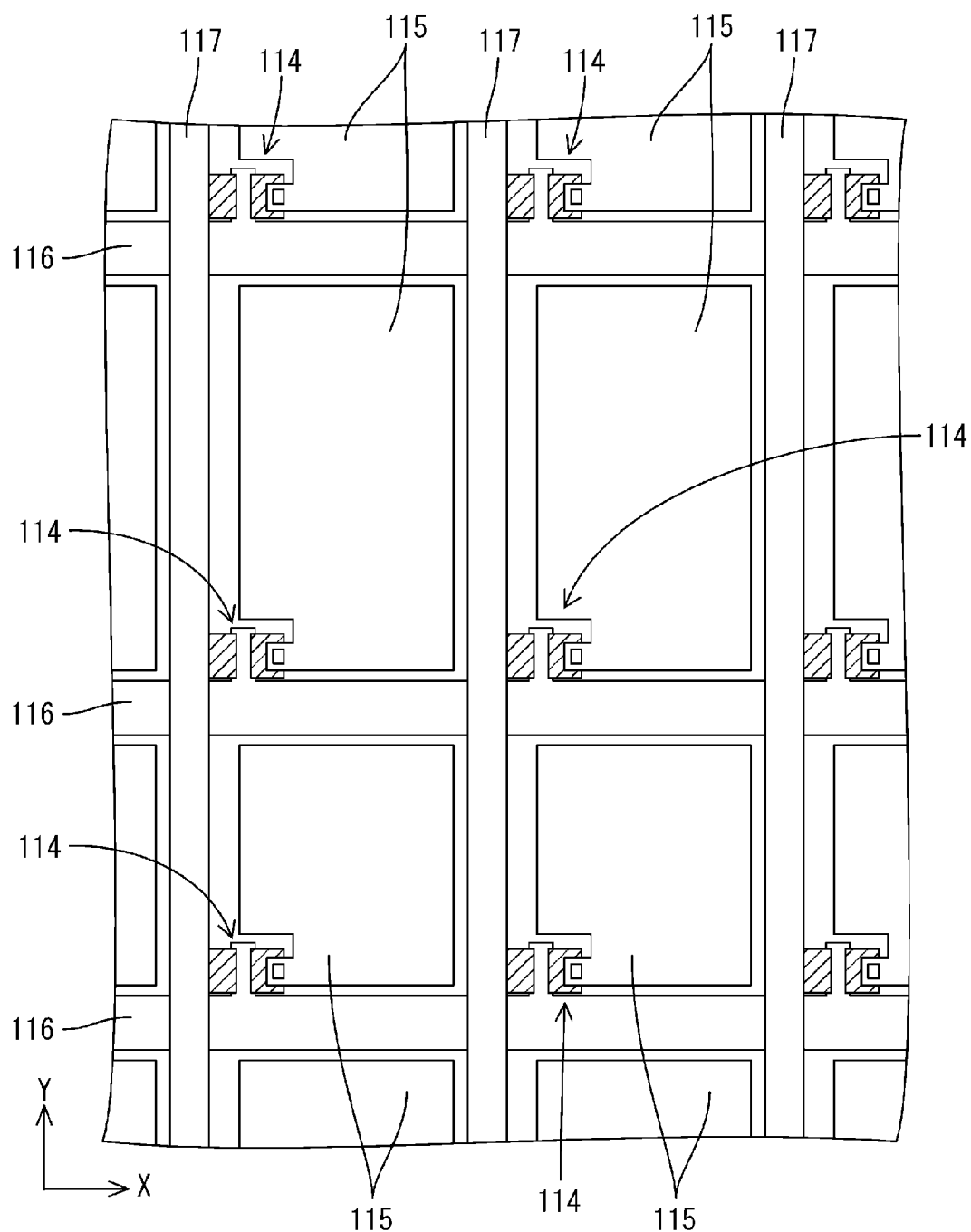
FIG. 24 is an enlarged plan view of an array substrate according to Modification Example 6.

Because of the above-mentioned configuration of the color filters, as shown in FIG. 24, the array substrate is configured such that the respective pixel electrodes disposed in adjacent rows have different column direction dimensions from each other. That is, the area of pixel electrodes that respectively face the red colored portions R and the blue colored portions B is larger than the area of pixel electrodes that respectively face the yellow colored portions Y and the green colored portions G. The film thicknesses of the respective colored portions R, G, B, and Y are the same as each other. The source wiring lines are disposed at the same pitch as each other, but the gate wiring lines are arranged at two different pitches corresponding to the column direction directions of the pixel electrodes. FIGS. 23 and 24 show a case in which the area of the red colored portions R and the blue colored portions B is approximately 1.6 times larger than the area of the yellow colored portions Y and the green colored portions G.

Figure 25:
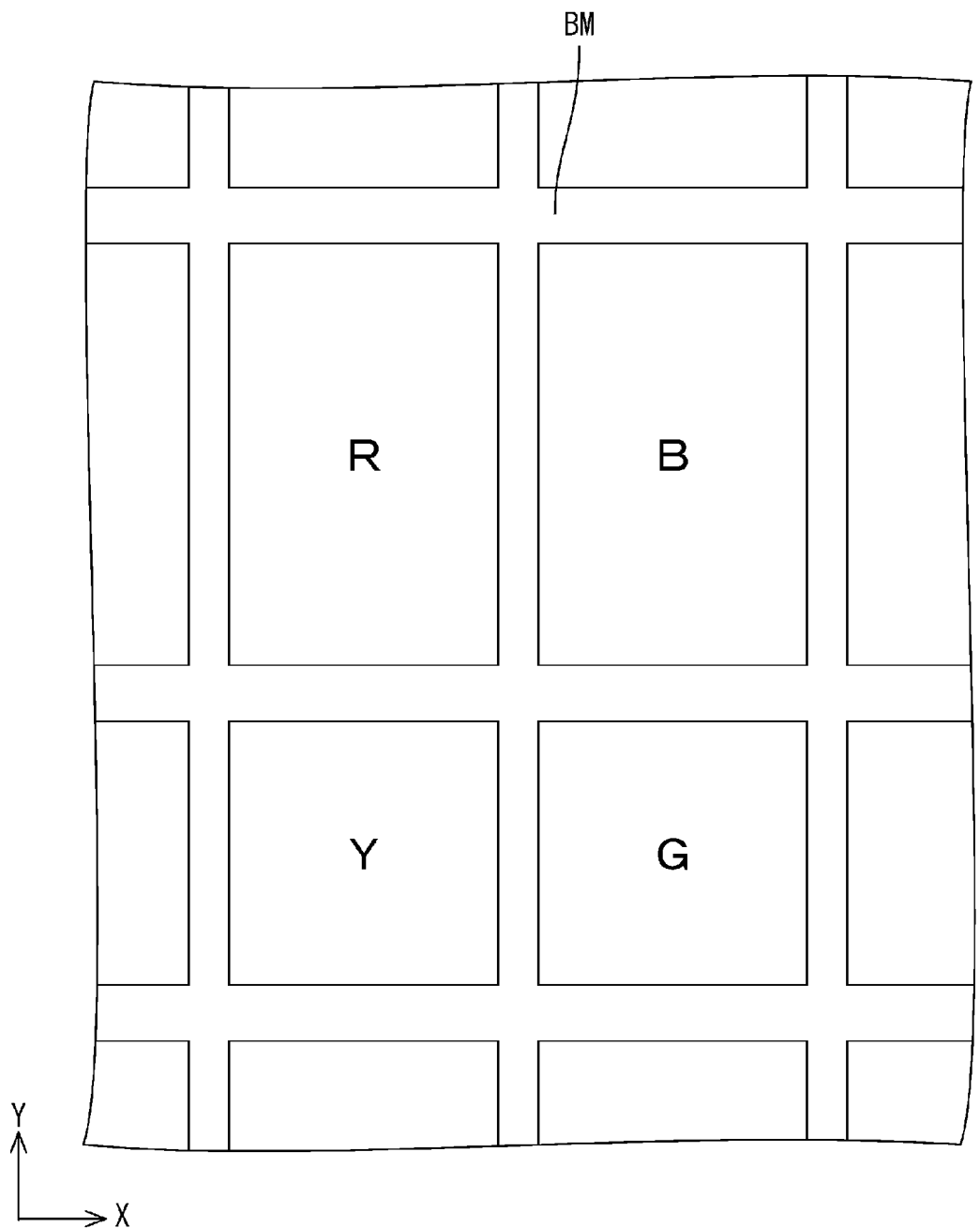
FIG. 25 is an enlarged plan view of a CF substrate according to Modification Example 7.

(13) As another modification example of the above-mentioned (12), as shown in FIG. 25, with respect to the color filters, it is also possible to employ a configuration in which the yellow colored portion Y is disposed adjacent to the red colored portion R in the column direction, and the green colored portion G is disposed adjacent to the blue colored portion B in the column direction.

Figure 26:
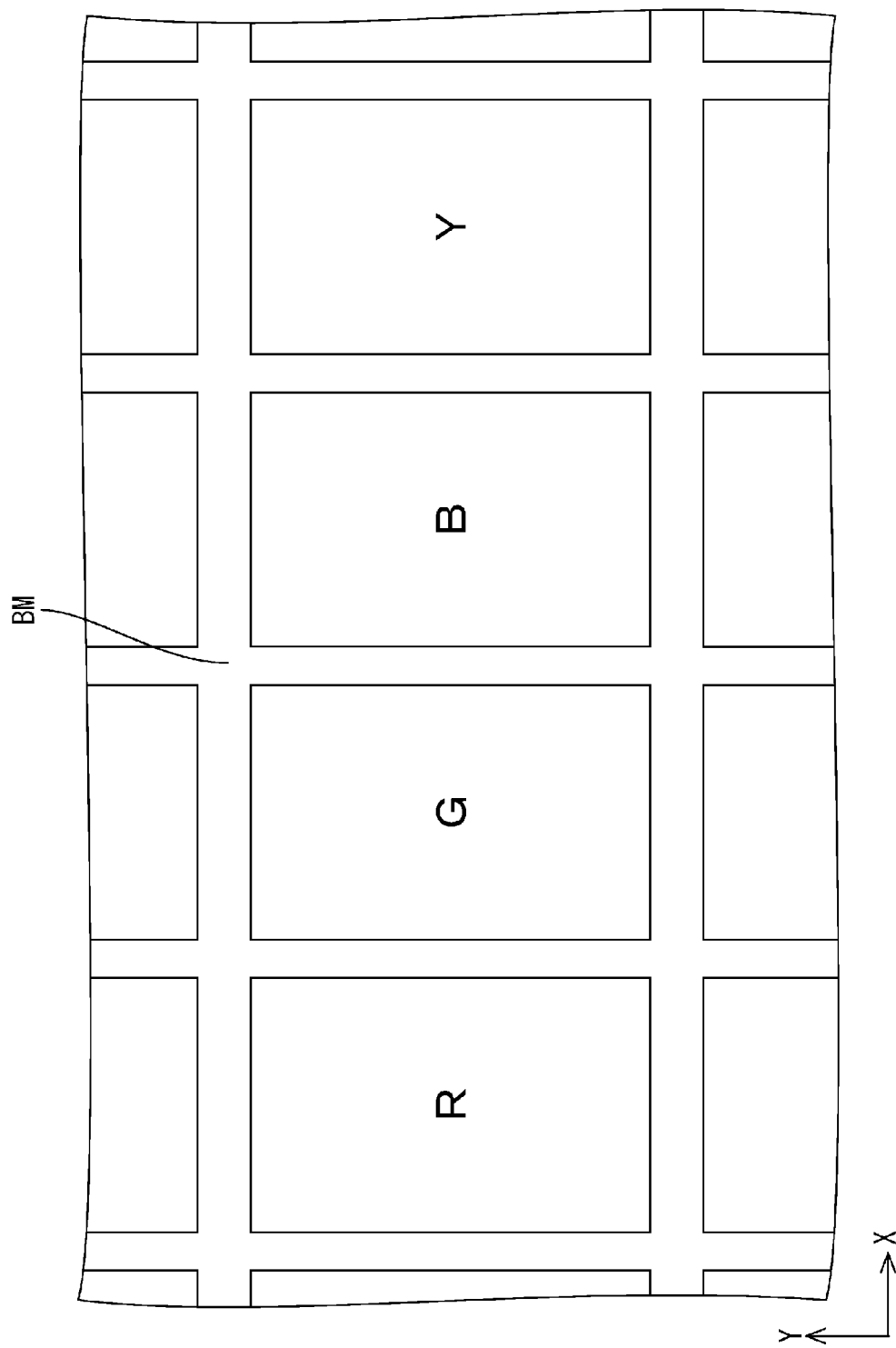
FIG. 26 is an enlarged plan view of a CF substrate according to Modification Example 8.
Figure 27:
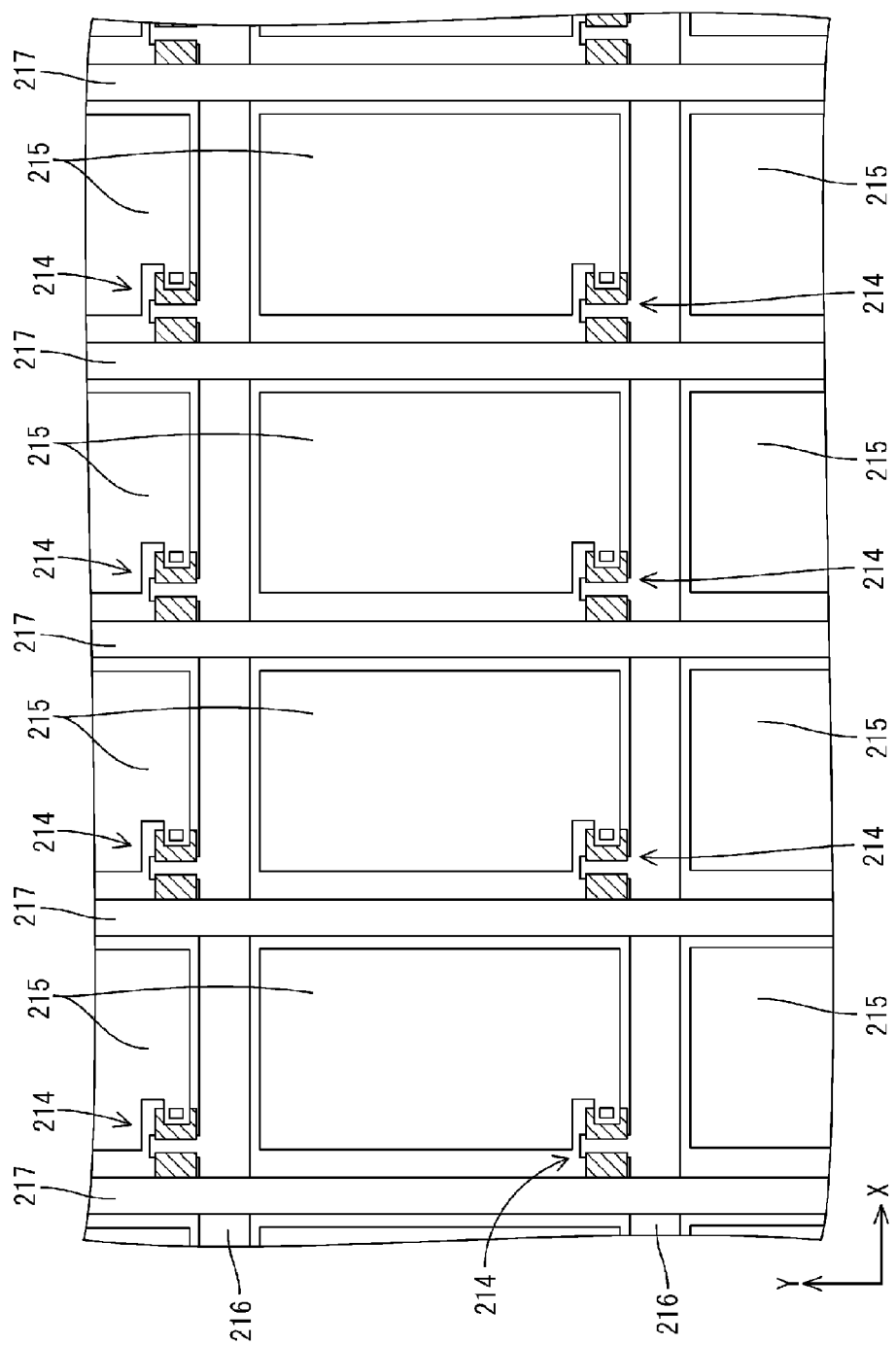
FIG. 27 is an enlarged plan view of an array substrate according to Modification Example 8.

(14) In the respective embodiments above, the configuration in which the areas of the respective colored portions R, G, B, and Y that constitute the color filters were different from each other was described as an example, but it is also possible to configure the respective colored portions R, G, B, and Y so as to be equal in area. Specifically, as shown in FIG. 26, the respective colored portions R, G, B, and Y are arranged in rows and columns with the X axis direction being the row direction and the Y axis direction being the column direction, and the dimension of the respective colored portions R, G, B, and Y in the row direction (X axis direction) and in the column direction (Y axis direction) is the same as each other. Accordingly, the area of the respective colored portions R, G, B, and Y is the same as each other. Because of the above-mentioned configuration of the color filters, as shown in FIG. 27, the array substrate is configured such that the respective pixel electrodes that face the respective colored portions R, G, B, and Y have the same dimensions in the row direction and in the column direction, thereby making all of the pixel electrodes have the same shape and the same area. The gate wiring lines and the source wiring lines are arranged at the same pitch as each other, respectively.

(15) In the above-mentioned (14), it is also possible to arrange the respective colored portions R, G, B, and Y in a manner similar to the above-mentioned (5) to (7).

(16) It is also possible to apply the configurations described in the above-mentioned (10) and (11) to the configurations described in the above-mentioned (12) and (14), respectively.

Figure 28:
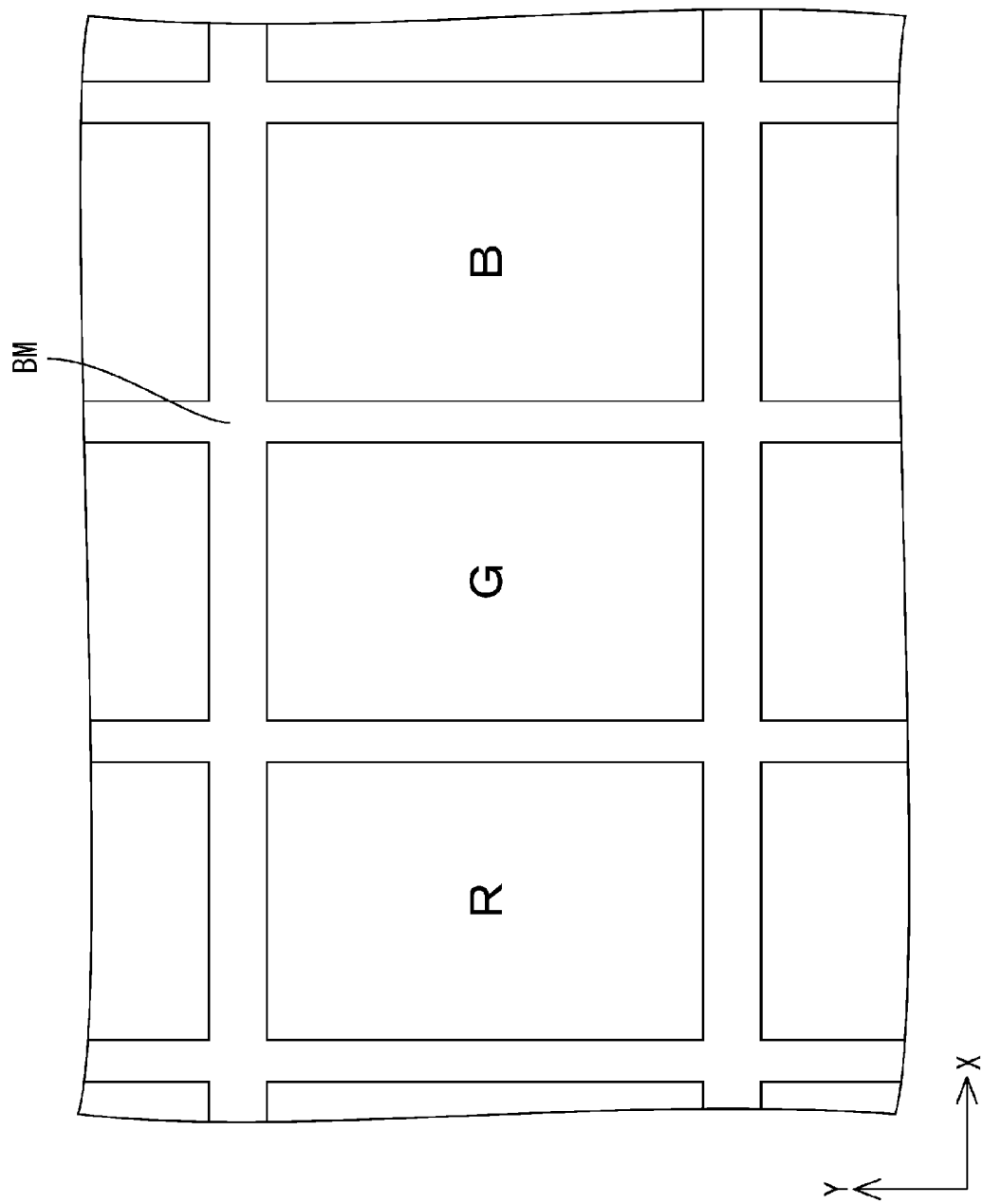
FIG. 28 is an enlarged plan view of a CF substrate according to Modification Example 9.

(17) In the respective embodiments above, the colored portions of the color filters had four colors, but as shown in FIG. 28, it is also possible to only have red (R), green (G), and blue (B), which are the three primary colors of light, omitting the yellow colored portions. In such a case, it is preferable that the area of the respective colored portions R, G, and B be the same as each other.

Figure 29:
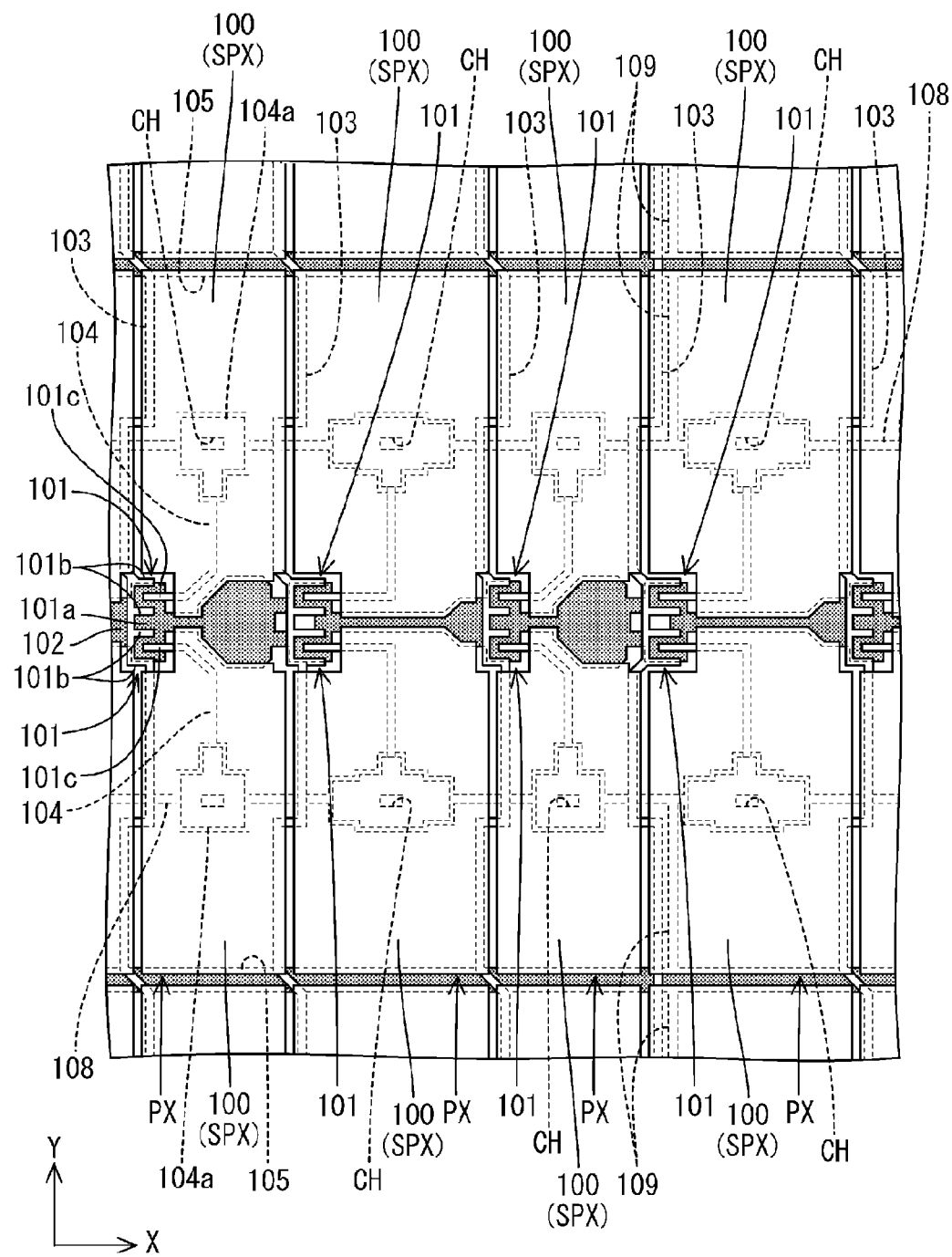
FIG. 29 is an enlarged plan view of an array substrate according to Modification Example 10.

(18) In the respective embodiments above, the configuration of the pixels was described with reference to simplified figures (FIGS. 4 and 5), but in addition to the configuration disclosed in these figures, the specific configuration of the pixels can be modified. For example, the present invention can also be applied to the configuration that conducts so-called multi-pixel driving in which each pixel is divided into a plurality of subpixels, and these subpixels are driven such that gradation values thereof are different from each other. As shown in FIG. 29, in the specific configuration thereof, one pixel PX is constituted of a pair of subpixels SPX, and the pair of subpixels SPX is constituted of a pair of pixel electrodes 100 adjacent to each other across a gate wiring line 102. On the other hand, on the gate wiring line 102, a pair of TFTs 101 is formed for the pair of pixel electrodes 100. The TFT 101 includes a gate electrode 101*a* made of a part of the gate wiring line 102; a source electrode 101*b* made of a pair of branching lines branching out from the source wiring line 103 and disposed on the gate electrode 101*a*; drain electrodes 101*c* formed at one end of a drain wiring line 104 that has a contact portion 104*a* connected to a pixel electrode 100 at the other end, the drain electrode 101*c* being disposed on the gate electrode 101*a* and positioned between the pair of source electrodes 101*b*. The pair of TFTs 101 is arranged on the gate wiring line 102 along the direction in which the pixel electrodes 100 are arranged (Y axis direction). On the other hand, at the pair of the pixel electrodes 100, an auxiliary capacitance wiring line 105 is disposed at an end of each pixel electrode on the side opposite to the gate wiring line 102 so as to overlap each pixel electrode in a plan view, and the auxiliary capacitance wiring line 105 forms a capacitance with the corresponding pixel electrode 100 the auxiliary capacitance wiring line 105 overlaps. In other words, the respective two pixel electrodes 100 that constitute one pixel PX form capacitance with the different auxiliary capacitance wiring lines 105. During the driving, the pair of TFTs 101 is supplied with a scan signal and a data signal from the common gate wiring line 102 and source wiring line 103, respectively, while the respective auxiliary capacitance wiring lines 105 that respectively overlap the two pixel electrodes 100 are supplied with signals (potentials) that differ from each other, thereby allowing the voltage values charged into the subpixels SPX, or in other words, the gradation values, to be made to differ from each other. With this configuration, it is possible to conduct so-called multi-pixel driving, and it is possible to have excellent viewing angle characteristics.

Figure 30:
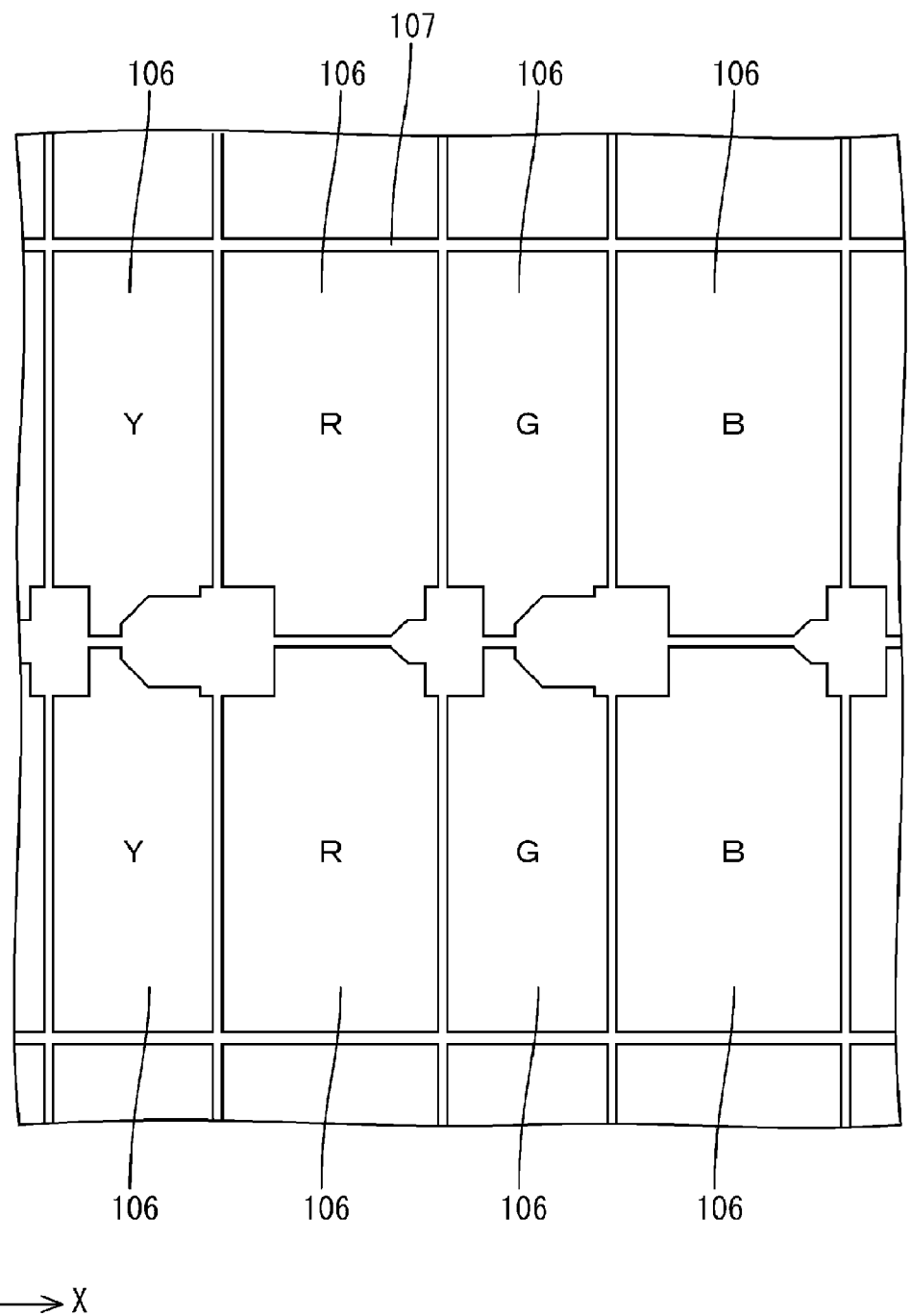
FIG. 30 is an enlarged plan view of a CF substrate according to Modification Example 10.

In the pixel configuration for conducting the above-mentioned multi-pixel driving, the respective pixel electrodes 100 and the respective colored portions R, G, B, and Y of the color filters 106, which face the respective pixel electrodes 100, have the following configuration. That is, as shown in FIG. 30, the color filters 106 are constituted of the colored portions of four colors R, G, B, and Y, and the yellow colored portion Y, the red colored portion R, the green colored portion G, and the blue colored portion B are repeatedly arranged in a row in this order from the left side of the figure along the X axis direction. The respective colored portions R, G, B, and Y are divided by a light-shielding layer (black matrix) 107, and the light-shielding layer 107 is arranged in a substantially grid pattern, overlapping the gate wiring lines 102, the source wiring lines 103, and the auxiliary capacitance wiring lines 105 in a plan view. Among the respective colored portions R, G, B, and Y, while the yellow colored portions Y and the green colored portions G have substantially the same dimension as each other with respect to the X axis direction (direction in which the colored portions R, G, B, and Y are arranged), the dimension of the red colored portions R and the blue colored portions B along the X axis direction is relatively large compared to that of the yellow colored portions Y and the green colored portions G (approximately 1.3 times to 1.4 times larger, for example). More specifically, the size of the red colored portions R along the X axis direction is slightly larger than the size of the blue colored portions B. As shown in FIG. 29, the respective pixel electrodes 100 have substantially the same size as each other with respect to the Y axis direction, but with respect to the X axis direction, the pixel electrodes 100 have the sizes that correspond to the sizes of the colored portions R, G, B, and Y of the color filters 106 that face the respective pixel electrodes 100.

Embodiments of the present invention were described above in detail, but these are merely examples, and do not limit the scope defined by the claims. The technical scope defined by the claims includes various modifications of the specific examples described above.

Also, the technical elements described in the present specification or shown in the drawings realize technical utility each on their own or through a combination of various technical elements, and are not limited to the combinations defined by the claims at the time of filing. Also, the techniques described in the present specification or shown in the drawings can accomplish a plurality of objects simultaneously, and each one of the objects on its own has technical utility.

DESCRIPTION OF REFERENCE CHARACTERS

TV television receiver
Ca, Cb cabinet
T tuner
VC image conversion circuit substrate
S stand
10 liquid crystal display device
11 liquid crystal panel
12 backlight device
13 bezel
22 chassis
22*a*, 122*a*, 222*a*, 322*a*, 422*a*, 522*a* bottom plate
24 LED 25, 125, 225, 325, 425, 525 LED substrate
26 frame
27, 127, 227, 327, 427, 527 diffusion lens
31, 131, 231, 331 first connector
32, 132, 232, 332 second connector
35, 135, 235, 335, 435, 535 wiring pattern
38, 138, 238, 338, 438, 538 power supply wiring line
431, 531 terminal
432, 532 card connector

The invention claimed is:

1. An illumination device, comprising:
a housing member that has a bottom plate and a side plate that rises from a side edge of said bottom plate, the housing member having an aperture on top to transmit light;
a light source substrate disposed on the bottom plate of the housing member such that one end face of the light source substrate faces the side plate;
light sources disposed on the light source substrate such that light is emitted upward;
patterned wiring disposed on the light source substrate and electrically connected to the light sources;
a first connecting member electrically connected to the patterned wiring and disposed on, of end portions of the light source substrate, an end portion that has said one end face;
a second connecting member electrically connected to the first connecting member in a connecting direction along a plane of the bottom plate of the housing member, the connecting direction also being, in a plan view, a direction directed toward said side edge of the bottom plate from a side opposite to said side edge across the first connecting member at an angle with respect to said side edge; and
a power supply wiring line electrically connected to the second connecting member and supplying power to the light sources through the second connecting member, the first connecting member, and the patterned wiring,
wherein the bottom plate has a horizontally long rectangular shape having a pair of first side edges along a short side direction of the bottom plate and a pair of second side edges along a long side direction of the bottom plate, said side edge from which said side plate rises being one of the first side edges,
wherein a plurality of said light source substrates are disposed on the bottom plate, and the respective one end faces of the light source substrates face the side plate that rises from said side edge,
wherein the plurality of light source substrates each have the first connecting member disposed thereon,
wherein a plurality of said first connecting members each have the second connecting member connected thereto, and
wherein all of a plurality of said second connecting members are connected to the respective first connecting members in the same connecting direction as each other.

2. The illumination device according to claim 1, further comprising a wiring insertion opening that goes through the bottom plate and through which the power supply wiring line is inserted, wherein the wiring insertion opening is provided on a center of the bottom plate.

3. The illumination device according to claim 1, wherein the power supply wiring line is connected to the second connecting member from a direction that is along the plane of the bottom plate and that is parallel to the second side edges in a plan view.

4. The illumination device according to claim 1, wherein the plurality of light source substrates form respective horizontally long quadrangular shapes, the plurality of light source substrates being disposed on the bottom plate in rows and columns such that both end faces of the short sides thereof go along the first side edges, and such that both end faces of the long sides thereof go along the second side edges, one of both end faces of the short sides being designated as the one end face.

5. The illumination device according to claim 1, wherein the second connecting member is connected to the first connecting member in a direction forming an acute angle with respect to the side edge where the side plate facing the one end face is disposed, and
wherein the acute angle is in a range of 30° to 60°.

6. A display device, comprising a display panel that conducts display by using light from the illumination device according to claim 1.

7. The illumination device according to claim 1, further comprising diffusion lenses disposed on each of the plurality of light source substrates, the diffusion lenses covering light-emitting sides of the respective light sources and diffusing light from the light sources.

8. The illumination device according to claim 7, further comprising a reflective sheet that has a bottom section laid over the light source substrates, lens insertion holes disposed in the bottom section and having the diffusion lenses respectively inserted therethrough, and inclined sections that rise upward near the side plates of the housing member,
wherein the light source substrates are disposed so that, among end portions thereof, an end portion that has the one end face is positioned between one of the inclined sections and one of the side plates rising from the first side edges.

9. The illumination device according to claim 1, wherein the light sources are white light-emitting diodes.

10. The illumination device according to claim 9, wherein the white light-emitting diodes are each made of any one of combinations that include: a combination of a first light-emitting chip that emits blue light and a first light-emitting layer disposed around the first light-emitting chip and having a luminescence peak in a yellow region; a combination of the first light-emitting chip that emits blue light and a second light-emitting layer disposed around the first light-emitting chip and having luminescence peaks in a green region and a red region, respectively; a combination of the first light-emitting chip that emits blue light, a third light-emitting layer disposed around the first light-emitting chip and having a luminescence peak in a green region, and a second light-emitting chip that emits red light; a combination of the first light-emitting chip that emits blue light, the second light-emitting chip that emits red light, and a third light-emitting chip that emits green light; and a combination of a fourth light-emitting chip that emits ultraviolet light, and a fourth light-emitting layer disposed around the fourth light-emitting chip and having luminescence peaks in a blue region and a red region.

11. An illumination device, comprising:
a housing member that has a bottom plate and a side plate that rises from a side edge of said bottom plate, the housing member having an aperture on top to transmit light;
a light source substrate disposed on the bottom plate of the housing member such that one end face of the light source substrate faces the side plate;
light sources disposed on the light source substrate such that light is emitted upward;

patterned wiring disposed on the light source substrate and electrically connected to the light sources;

a first connecting member electrically connected to the patterned wiring and disposed on, of end portions of the light source substrate, an end portion that has said one end face;

a second connecting member electrically connected to the first connecting member in a connecting direction along a plane of the bottom plate of the housing member, the connecting direction also being, in a plan view, a direction directed toward said side edge of the bottom plate from a side opposite to said side edge across the first connecting member at an angle with respect to said side edge; and a power supply wiring line electrically connected to the second connecting member and supplying power to the light sources through the second connecting member, the first connecting member, and the patterned wiring, wherein the bottom plate has a horizontally long rectangular shape having a pair of first side edges along a short side direction of the bottom plate and a pair of second side edges along a long side direction of the bottom plate, said side edge from which said side plate rises being one of the first side edges, wherein a plurality of said light source substrates are disposed on the bottom plate, and the respective one end faces of the light source substrates face the side plate that rises from the said side edge, wherein the plurality of light source substrates each have the first connecting member disposed thereon, wherein a plurality of said first connecting members each have the second connecting member connected thereto, wherein the plurality of light source substrates are aligned along the short side direction of the bottom plate, and wherein a plurality of said second connecting members are connected to the respective first connecting members in connecting directions respectively directed towards the respective second side edges from a center of the bottom plate in the short side direction.

12. The illumination device according to claim 11, further comprising a wiring insertion opening that goes through the bottom plate and through which the power supply wiring line is inserted, wherein the wiring insertion opening is provided on a center of the bottom plate.

13. The illumination device according to claim 11, wherein the power supply wiring line is connected to the second connecting member from a direction that is along the plane of the bottom plate and that is parallel to the second side edges in a plan view.

14. The illumination device according to claim 11, wherein the plurality of light source substrates form respective horizontally long quadrangular shapes, the plurality of light source substrates being disposed on the bottom plate in rows and columns such that both end faces of the short sides thereof go along the first side edges, and such that both end faces of the long sides thereof go along the second side edges, one of both end faces of the short sides being designated as the one end face.

15. The illumination device according to claim 11, wherein the second connecting member is connected to the first connecting member in a direction forming an acute angle with respect to the side edge where the side plate facing the one end face is disposed, and wherein the acute angle is in a range of 30° to 60°.

16. A display device, comprising a display panel that conducts display by using light from the illumination device according to claim 11.

17. The illumination device according to claim 11, further comprising diffusion lenses disposed on each of the plurality of light source substrates, the diffusion lenses covering light-emitting sides of the respective light sources and diffusing light from the light sources.

18. The illumination device according to claim 17, further comprising a reflective sheet that has a bottom section laid over the light source substrates, lens insertion holes disposed in the bottom section and having the diffusion lenses respectively inserted therethrough, and inclined sections that rise upward near the side plates of the housing member, wherein the light source substrates are disposed so that, among end portions thereof, an end portion that has the one end face is positioned between one of the inclined sections and one of the side plates rising from the first side edges.

19. The illumination device according to claim 11, wherein the light sources are white light-emitting diodes.

20. The illumination device according to claim 19, wherein the white light-emitting diodes are each made of any one of combinations that include: a combination of a first light-emitting chip that emits blue light and a first light-emitting layer disposed around the first light-emitting chip and having a luminescence peak in a yellow region; a combination of the first light-emitting chip that emits blue light and a second light-emitting layer disposed around the first light-emitting chip and having luminescence peaks in a green region and a red region, respectively; a combination of the first light-emitting chip that emits blue light, a third light-emitting layer disposed around the first light-emitting chip and having a luminescence peak in a green region, and a second light-emitting chip that emits red light; a combination of the first light-emitting chip that emits blue light, the second light-emitting chip that emits red light, and a third light-emitting chip that emits green light; and a combination of a fourth light-emitting chip that emits ultraviolet light, and a fourth light-emitting layer disposed around the fourth light-emitting chip and having luminescence peaks in a blue region and a red region.

* * * * *